US008081199B2

(12) United States Patent
Takata et al.

(10) Patent No.: US 8,081,199 B2
(45) Date of Patent: Dec. 20, 2011

(54) LIGHT EMITTING ELEMENT DRIVE APPARATUS, PLANAR ILLUMINATION APPARATUS, AND LIQUID CRYSTAL DISPLAY APPARATUS

(75) Inventors: Go Takata, Hyogo (JP); Hideyuki Nakanishi, Okayama (JP); Toshiki Onishi, Osaka (JP); Akihiro Yamamura, Osaka (JP); Takahiro Kobayashi, Okayama (JP)

(73) Assignee: Panasonic Corporation, Osaka (JP)

( * ) Notice: Subject to any disclaimer, the term of this patent is extended or adjusted under 35 U.S.C. 154(b) by 92 days.

(21) Appl. No.: 12/769,399

(22) Filed: Apr. 28, 2010

(65) Prior Publication Data

US 2010/0328370 A1 Dec. 30, 2010

Related U.S. Application Data

(63) Continuation-in-part of application No. PCT/JP2010/001748, filed on Mar. 11, 2010.

(30) Foreign Application Priority Data

Jun. 26, 2009 (JP) ................................ 2009-151949

(51) Int. Cl.
  *G09G 3/32* (2006.01)
  *G09G 3/36* (2006.01)
  *G09G 5/02* (2006.01)
(52) U.S. Cl. ............. 345/694; 345/76; 345/82; 345/102
(58) Field of Classification Search .............. 345/76–83, 345/102, 36, 39, 44–46, 694; 315/169.3; 313/463, 504
See application file for complete search history.

(56) References Cited

U.S. PATENT DOCUMENTS

| 6,515,434 | B1 * | 2/2003 | Biebl ............................. 315/291 |
| 6,822,403 | B2 | 11/2004 | Horiuchi et al. |
| 6,864,641 | B2 * | 3/2005 | Dygert ........................... 315/216 |
| 7,723,922 | B2 * | 5/2010 | Lee et al. ..................... 315/210 |
| 7,825,610 | B2 * | 11/2010 | Zhao et al. .................... 315/299 |
| 7,948,468 | B2 * | 5/2011 | Zane et al. .................... 345/102 |
| 2005/0093792 | A1 | 5/2005 | Yamamoto et al. |
| 2007/0296353 | A1 | 12/2007 | Ito et al. |
| 2008/0122383 | A1 | 5/2008 | Katoh |
| 2008/0129225 | A1 | 6/2008 | Yamamoto et al. |

FOREIGN PATENT DOCUMENTS

| JP | 2003-332624 | 11/2003 |
| JP | 2006-187187 | 7/2006 |
| JP | 2007-189004 | 7/2007 |
| JP | 2007-208113 | 8/2007 |
| JP | 2007-236095 | 9/2007 |
| JP | 2008-134288 | 6/2008 |
| JP | 2008-305978 | 12/2008 |
| WO | 2006/059437 | 6/2006 |

* cited by examiner

*Primary Examiner* — Jimmy H Nguyen
(74) *Attorney, Agent, or Firm* — Hamre, Schumann, Mueller & Larson, P.C.

(57) ABSTRACT

A light emitting element drive apparatus that drives light emitting elements reduces power loss caused by variability between forward voltage drops of the light emitting elements. A plurality of voltage applying sections (1, 32 and 33; and 2, 34 and 35) generate application voltages based on a detection voltage determined based on a maximum forward voltage drop among the forward voltage drops of the light emitting element arrays (11 to 14), and apply the generated application voltages to the light emitting elements (11 to 14). Switching sections (30 and 31) switch between a plurality of voltage applying sections (1, 32 and 33; and 2, 34 and 35) to which the light emitting element arrays (11 to 14) individually connect. Controlling sections (40 to 42) control the switching sections (30 and 31) to switch connection to minimize the difference between forward voltage drops of light emitting element arrays (11 to 14).

24 Claims, 13 Drawing Sheets

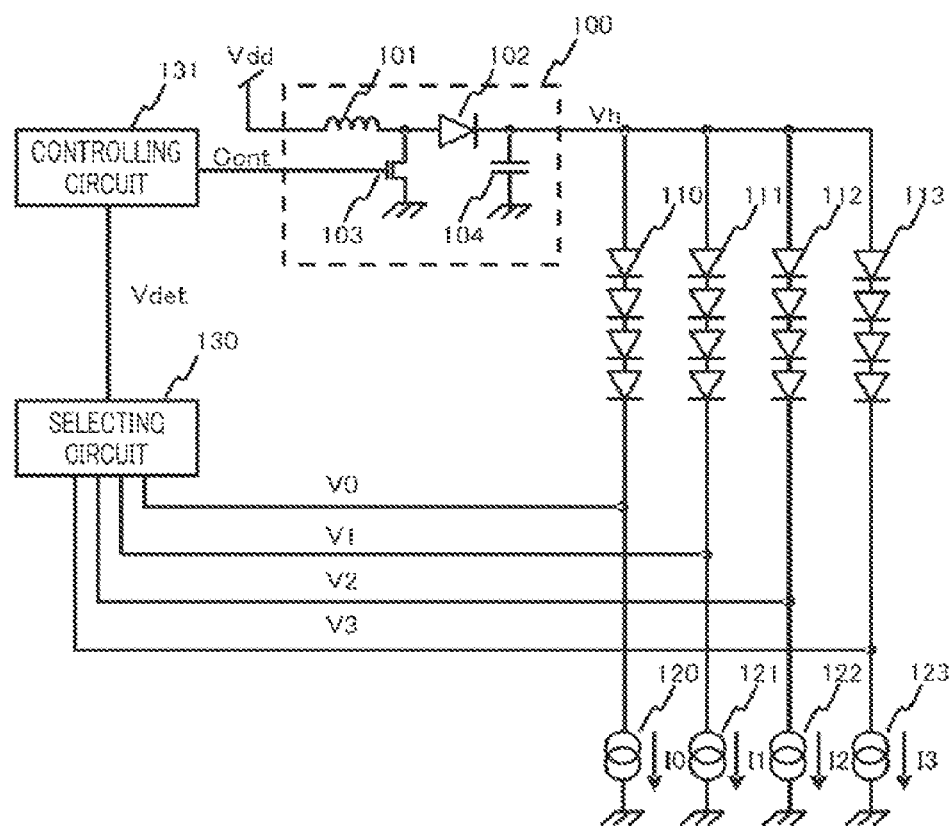
FIG.1     "PRIOR ART"
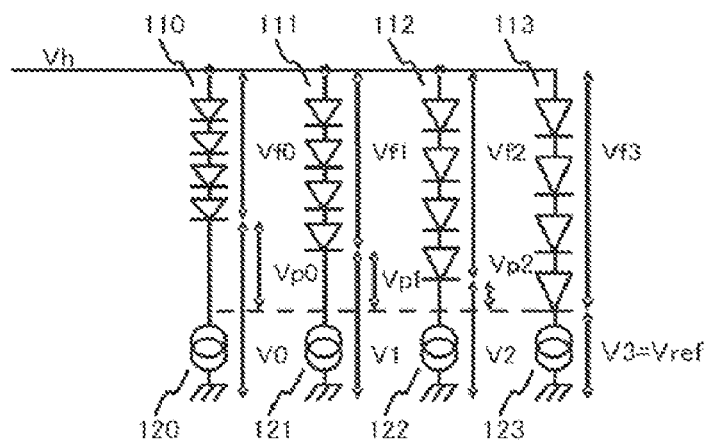
FIG.2     "PRIOR ART"

| STEP | 1 | 2 | 3 | 4 | 5 |
|---|---|---|---|---|---|
| VOLTAGE CONVERTING CIRCUIT 1 | LED ARRAY LOAD 14 (VF=14V, Vfb 4=3V) | LED ARRAY LOAD 16 (VF=16V, Vfb 6=5V) | MaxAdj1 | LED ARRAY LOAD 19 (VF=19V, Vfb 9=1V) | LED ARRAY LOAD 19 (VF=19V, Vfb 9=1V) |
| | LED ARRAY LOAD 16 (VF=16V, Vfb 6=1V) | LED ARRAY LOAD 15 (VF=15V, Vfb 5=2V) | — | LED ARRAY LOAD 18 (VF=18V, Vfb 8=2V) | LED ARRAY LOAD 18 (VF=18V, Vfb 8=2V) |
| | LED ARRAY LOAD 17 (VF=17V, Vfb 7=2V) | LED ARRAY LOAD 17 (VF=17V, Vfb 7=2V) | MaxAdj2 | LED ARRAY LOAD 16 (VF=16V, Vfb 6=4V) | LED ARRAY LOAD 17 (VF=17V, Vfb 7=3V) |
| | LED ARRAY LOAD 11 (VF=11V, Vfb 1=6V) | LED ARRAY LOAD 19 (VF=19V, Vfb 9=1V) | — | LED ARRAY LOAD 17 (VF=17V, Vfb 7=1V) | LED ARRAY LOAD 16 (VF=16V, Vfb 6=1V) |
| VOLTAGE CONVERTING CIRCUIT 2 | LED ARRAY LOAD 15 (VF=15V, Vfb 5=2V) | LED ARRAY LOAD 14 (VF=14V, Vfb 4=3V) | MaxAdj2 | LED ARRAY LOAD 15 (VF=15V, Vfb 5=1V) | LED ARRAY LOAD 14 (VF=14V, Vfb 4=3V) |
| | LED ARRAY LOAD 18 (VF=18V, Vfb 8=1V) | LED ARRAY LOAD 13 (VF=13V, Vfb 3=4V) | — | LED ARRAY LOAD 14 (VF=14V, Vfb 4=3V) | LED ARRAY LOAD 13 (VF=13V, Vfb 3=1V) |
| | LED ARRAY LOAD 13 (VF=13V, Vfb 3=7V) | LED ARRAY LOAD 10 (VF=10V, Vfb 10=4V) | MaxAdj3 | LED ARRAY LOAD 13 (VF=13V, Vfb 3=1V) | LED ARRAY LOAD 12 (VF=12V, Vfb 2=2V) |
| VOLTAGE CONVERTING CIRCUIT 3 | LED ARRAY LOAD 12 (VF=12V, Vfb 2=8V) | LED ARRAY LOAD 12 (VF=12V, Vfb 2=2V) | — | LED ARRAY LOAD 12 (VF=12V, Vfb 2=2V) | LED ARRAY LOAD 11 (VF=11V, Vfb 1=1V) |
| | LED ARRAY LOAD 10 (VF=10V, Vfb 10=8V) | LED ARRAY LOAD 11 (VF=11V, Vfb 1=3V) | MinAdj3 | LED ARRAY LOAD 11 (VF=11V, Vfb 1=1V) | LED ARRAY LOAD 10 (VF=10V, Vfb 10=3V) |
| SUM OF Vfb 1 TO 9 | 30V | 24V | 21V | 20V | 18V |
| OPERATION OF SWITCHING CONTROLLING SECTION | [VOLTAGE CONVERTER 1→2] RECONNECT LED ARRAY LOADS 14 AND 18 <br> [VOLTAGE CONVERTER 2→3] RECONNECT LED ARRAY LOADS 11 AND 10 | [VOLTAGE CONVERTER 1→2] RECONNECT LED ARRAY LOADS 16 AND 13 <br> [VOLTAGE CONVERTER 2→3] RECONNECT LED ARRAY LOADS 13 AND 14 | [VOLTAGE CONVERTER 1→2] RECONNECT LED ARRAY LOADS 16 AND 17 <br> [VOLTAGE CONVERTER 2→3] RECONNECT LED ARRAY LOADS 12 AND 14 | [VOLTAGE CONVERTER 1→2] RECONNECT LED ARRAY LOADS 16 AND 17 <br> —RECONNECTION REPEATS TWICE AND THEREFORE ENDS | |

FIG.14

LIGHT EMITTING ELEMENT DRIVE APPARATUS, PLANAR ILLUMINATION APPARATUS, AND LIQUID CRYSTAL DISPLAY APPARATUS

CROSS REFERENCE TO RELATED APPLICATIONS

This application is a continuation in part of International Patent Application No. PCT/JP2010/001748, filed on Mar. 11, 2010, the disclosure of which is incorporated herein by reference in its entirety. International Patent Application No. PCT/JP2010/001748 is entitled to (or claims) the benefit of Japanese Patent Application No. 2009-151949, filed on Jun. 26, 2009, the disclosure of which is incorporated herein by reference in its entirety.

TECHNICAL FIELD

The technical field relates to a light emitting element drive apparatus that drives light emitting elements such as LEDs (Light Emitting Diodes) connected to power supply circuits by constant currents, a planar illumination apparatus that has this light emitting element drive apparatus and a liquid crystal display apparatus that uses this planar illumination apparatus as the backlight.

BACKGROUND ART

Recently, as one example of usage of LEDs, the use of LEDs for an LCD (Liquid Crystal Display) backlight is becoming popular. Generally, when LEDs are used for an LCD backlight, light is emitted by applying a predetermined constant current to a plurality of LEDs connected in series. In this case, the number of LEDs and the amount of current are determined according to the amount of light required. Further, the drive voltage for driving LEDs is generated in a voltage converting circuit that converts a power supply voltage into a predetermined voltage. This voltage converting circuit controls the drive voltage by detecting the voltage values or current values of predetermined terminals of LEDs, which are loads, and feeding back these values. For example, Patent Literature 1 discloses the above-described LED drive technique.

The light emitting element drive apparatus disclosed in Patent Literature 1 will be briefly explained below using FIG. 1. This conventional light emitting element drive apparatus has a plurality of rows of LED array loads formed by connecting one or more LEDs in series. LED array loads 110 to 113 are driven by constant currents I0 to I3 generated by constant current sources 120 to 123 each connected to cathode terminals of LED array loads 110 to 113 in series. Cathode terminal voltages V0 to V3 of LED array loads 110 to 113 are received as input in selecting circuit 130. Selecting circuit 130 selects the minimum voltage of cathode terminal voltages V0 to V3, outputs this voltage as detected voltage Vdet and inputs detected voltage Vdet in controlling circuit 131. Controlling circuit 131 compares detected voltage Vdet and internal reference voltage Vref (not shown). Then, controlling circuit 131 inputs switching signal Cont for operating voltage converting circuit 100 to make detected voltage Vdet equal to reference voltage Vref, to the gate of transistor 103. Note that voltage converting circuit 100 is a boost converter formed with coil 101, diode 102, transistor 103 and capacitor 104, and converts predetermined input voltage Vdd into output voltage Vh required to drive LED array loads 110 and 113. Output voltage Vh is supplied to the anode terminals of LED array loads 110 to 113.

In the conventional light emitting element drive apparatus shown in FIG. 1, by individually driving constant current sources 120 to 123 on and off and adjusting the proportion of the duration of "on" and the duration of "off," it is possible to adjust the amount of current that flows to LED array loads 110 to 113. By this means, it is possible to individually adjust the brightness of each LED array load. Further, selecting circuit 130 operates to control output voltage Vh of voltage converting circuit 100 according to the LED array load producing the maximum forward voltage drop among LED array loads 110 to 113 (that is, the LED array load having the minimum cathode terminal voltage among cathode terminal voltages V0 to V3). Consequently, it is possible to drive LED array loads 110 to 113 with little loss, while securing sufficient light emission from LED array loads 110 to 113.

CITATION LIST

Patent Literature

PTL 1: Japanese Patent Application Laid-Open No. 2003-332624

SUMMARY

Technical Problem

Now, assume a case where, as shown in FIG. 2, there is individual variability between LEDs in a conventional light emitting element drive apparatus, and therefore forward voltage drops Vf0 to Vf3 of LED array loads 110 to 113 have variability (assume Vf0<Vf1<Vf2<Vf3 here). In this case, output voltage Vh of voltage converting circuit 100 is controlled according to LED array load 113 producing maximum forward 2.0 voltage drop Vf3. Therefore, voltages Vp0 to Vp2 corresponding to the variability are applied as extra voltages to constant current sources 120 to 122 connected to other LED array loads 110 to 112. As a result, loss of power having the magnitude multiplying voltages Vp0 to Vp2 with constant currents I1 to I2, respectively, is produced, thereby increasing power consumption of the light emitting element drive apparatus.

A case has been shown where the number of LEDs connected in series per LED array load is four, and the number of LED array loads connected in parallel is four. However, when the scale of LED array loads increases, the influences of individual variability between LEDs become more significant, and therefore the increase in power consumption becomes a serious problem. Further, if loss of power to apply to constant current sources increases, this substantially influences allowable power dissipation of a package of a light emitting element drive apparatus and makes it necessary to provide a package having a greater allowable power dissipation.

The object is to provide a light emitting element drive apparatus that can suppress the increase in power consumption produced by variability between forward voltage drops of LEDs, and a planar illumination apparatus and a liquid crystal display apparatus that use the light emitting element drive apparatus.

Solution to Problem

To achieve the above object, the light emitting element drive apparatus includes: a plurality of voltage applying sections that generate application voltages, based on a detection voltage determined based on a maximum forward voltage drop among forward voltage drops of a plurality of light emitting element arrays, and that apply the generated application voltages to the plurality of light emitting element arrays; a switching section that switches voltage applying sections to which the plurality of light emitting element arrays are individually connected, between the plurality of voltage applying sections; and a controlling section that controls the switching section to switch connection so that a difference between the forward voltage drops of the plurality of light emitting element arrays is minimized.

Further, the planar illumination apparatus includes: a plurality of light emitting element arrays arranged on a planar surface; and the light emitting element drive apparatus according to claim 1 that connects to the plurality of light emitting element arrays.

Furthermore, the liquid crystal display apparatus includes: the planar illumination apparatus; and a liquid crystal panel that receives illumination light on a back surface thereof, as input from the planar illumination apparatus and displays an image by spatially modulating the illumination light according to an image signal.

Advantageous Effects

According to the light emitting element drive apparatus, it is possible to suppress the increase in power consumption produced by variability between forward voltage drops of LEDs by classifying LED array loads based on the magnitudes of forward voltage drops of LED array loads and performing a reconnection control of the LED array loads between a plurality of voltage converting circuits.

BRIEF DESCRIPTION OF DRAWINGS

FIG. 1 a block diagram showing a configuration of a conventional light emitting element drive apparatus;

FIG. 2 illustrates an operation in case where there is variability between forward voltage drops of LEDs in a conventional light emitting element drive apparatus;

FIG. 14 is a transition diagram showing an operation sequence of a light emitting element drive apparatus according to Embodiment 5 of the present invention;

DESCRIPTION OF EMBODIMENTS

Hereinafter, embodiments of a light emitting element drive apparatus according to the present invention will be explained with reference to the accompanying drawings. Note that numbers described in the following embodiments are illustrated to explain the embodiments of the present invention in detail, and the present invention is not limited to the illustrated numbers.

Embodiment 1

Figure 3:
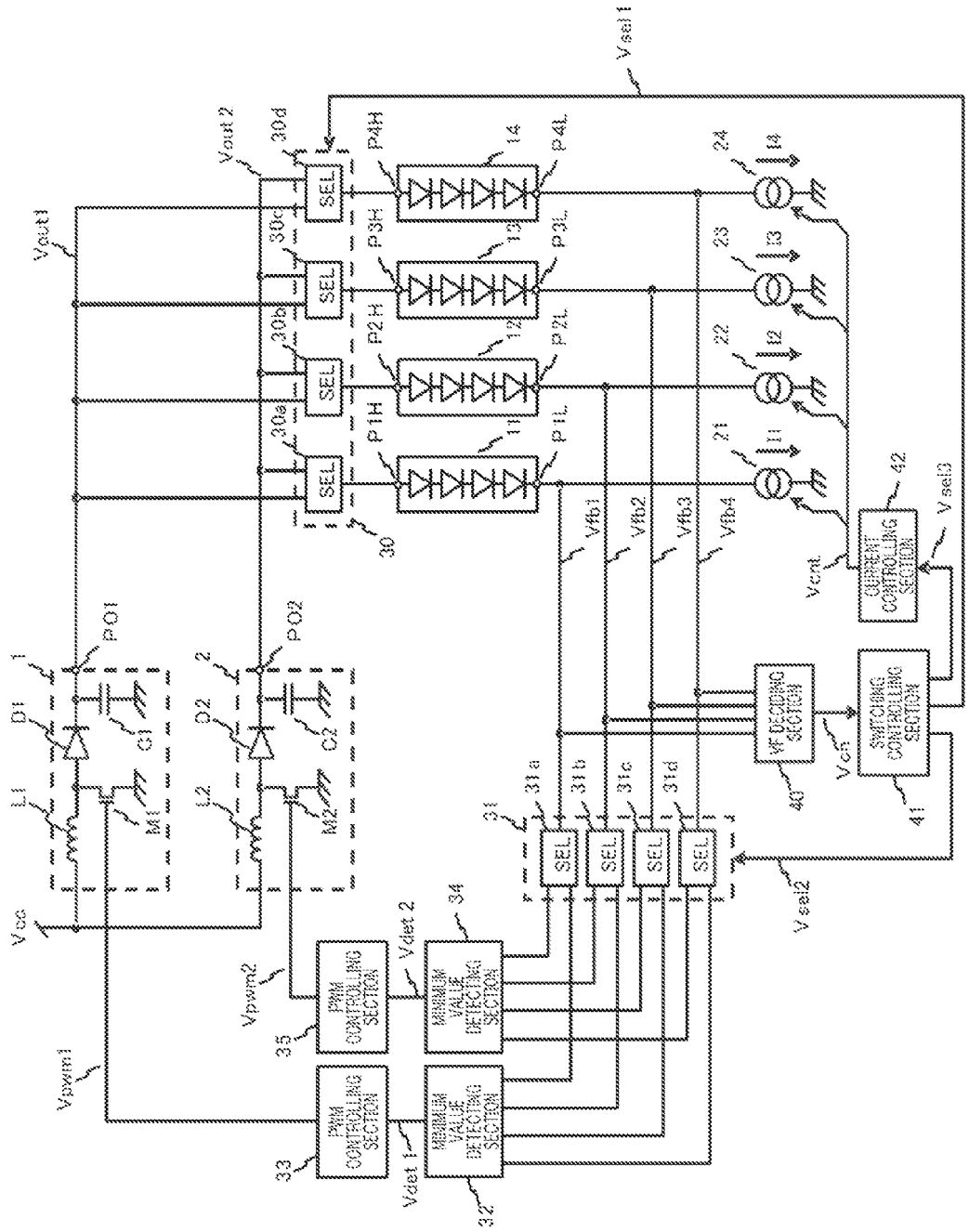
FIG. 3 is a block diagram showing an overall configuration example of a light emitting element drive apparatus according to Embodiment 1 of the present invention.

A light emitting element drive apparatus according to Embodiment 1 of the present invention will be explained using FIG. 3 to FIG. 6. FIG. 3 is a block diagram showing an overall configuration example of a light emitting element drive apparatus according to Embodiment 1. As shown in FIG. 3, this light emitting element drive apparatus has voltage converting circuits 1 and 2, switching circuits 30 and 31, constant current sources 21 to 24, minimum value detecting sections 32 and 34, PWM controlling sections 33 and 35, VF deciding section 40, switching controlling section 41 and current controlling section 42, and drives LED array loads 11 to 14.

Note that the configuration combining voltage converting circuit 1, minimum value detecting section 32 and PWM controlling section 33 is a specific example of one voltage applying section. Further, the configuration combining switching circuits 30 and 31 is a specific example of a switching section. Furthermore, the configuration combining VF deciding section 40, switching controlling section 41 and current controlling section 42 is a specific example of a controlling section. Still further, LED array loads 11 to 14 are each a specific example of a light emitting element array.

The voltage applying section determines and applies the application voltage to a plurality of light emitting element arrays connected with the voltage applying section, based on the detected voltage determined based on the maximum forward voltage drop among the forward voltage drops of a plurality of light emitting element arrays connected with each voltage applying section. The switching section switches the connections of the light emitting element arrays between a plurality of voltage applying sections. The controlling section controls the switching section so as to minimize the difference between the forward voltage drops of a plurality of light emitting element arrays connected to each voltage applying section. Hereinafter, details will be explained using a specific configuration.

Voltage converting circuit 1 is a boost switching power supply, and is formed with coil L1, diode D1, transistor M1 and capacitor C1. Voltage converting circuit 1 boosts predetermined input voltage Vcc to output voltage Vout1 required to drive LED array loads 11 to 14, based on control signal Vpwm1 from PWM controlling section 33, and outputs output voltage Vout1.

Voltage converting circuit 2 is a boost switching power supply, and is formed with coil L2, diode D2, transistor M2 and capacitor C2. Voltage converting circuit 2 boosts predetermined input voltage Vcc to output voltage Vout2 required to drive LED array loads 11 to 14, based on control signal Vpwm2 from PWM controlling section 35, and outputs output voltage Vout2.

Switching circuit 30 is a selector circuit group including selectors 30a to 30d. Switching circuit 30 connects each one of anode terminals P1H to P4H of LED array loads 11 to 14 to one of output terminal PO1 of voltage converting circuit 1 and output terminal PO2 of voltage converting circuit 2, based on control signal Vsel1 from switching controlling section 41. Selectors 30a to 30d are formed with, for example, MOS switches.

Constant current sources 21 to 24 connect to cathode terminals P1L to P4L of LED array loads 11 to 14 in series, respectively, and supply constant currents I1 to I4 required by LEDs to emit light, to LED array loads 11 to 14. Constant current sources 21 to 24 can perform an on/off control based on control signal Vcnt from current controlling section 42, and adjusts the proportion of the duration of "on" and the duration of "off." By this means, it is possible to adjust the amount of current to supply to LED array loads 11 to 14 and control the amount of light emitted from LEDs.

Switching circuit 31 is a selector circuit group including selectors 31a to 31d. Switching circuit 31 connects each one of cathode terminal voltages Vfb1 to Vfb4 of LED array loads 11 to 14 to one of minimum value detecting section 32 and minimum value detecting section 34, based on control signal Vsel2 from switching controlling section 41. Selectors 31a to 31d are formed with, for example, MOS switches. Cathode terminal voltages Vfb1 to Vfb4 of LED array loads 11 to 14 are determined based on the forward voltage drops of LED array loads 11 to 14.

Minimum value detecting section 32 selects the minimum voltage among the cathode terminal voltages connected in switching circuit 31, and inputs the minimum voltage to PWM controlling section 33 as detected voltage Vdet1. Detected voltage Vdet1 needs not to be the same voltage as the selected minimum cathode terminal voltage, and may be generated based on, for example, a minimum voltage among the cathode voltages shifted by a predetermined voltage.

Minimum value detecting section 34 selects the minimum voltage among the cathode terminal voltages connected in switching circuit 31, and inputs the minimum voltage to PWM controlling section 35 as detected voltage Vdet2. Detected voltage Vdet2 needs not to be the same voltage as the selected minimum cathode terminal voltage, and may be generated based on, for example, a minimum voltage among the cathode voltages shifted by a predetermined voltage. Minimum value detecting sections 32 and 34 are each an example of a detecting circuit.

PWM controlling section 33 compares inputted detected voltage Vdet1 and reference signal Vref (not shown). Based on this comparison result, control signal Vpwm1 is inputted to the gate of transistor M1 of voltage converting circuit 1 to make detected voltage Vdet1 equal to reference voltage Vref. Based on this control signal Vpwm1, voltage converting circuit 1 switches transistor M1, and generates output voltage Vout1.

PWM controlling section 35 compares inputted detected voltage Vdet2 and reference signal Vref (not shown). Based on this comparison result, control signal Vpwm2 is inputted to the gate of transistor M2 of voltage converting circuit 2 to make detected voltage Vdet2 equal to reference voltage Vref. Based on this control signal Vpwm2, voltage converting circuit 2 switches transistor M2, and generates output voltage Vout2.

VF deciding section 40 decides the magnitude of forward voltage drop is greater among LED array loads 11 to 14, based on inputted cathode terminal voltages Vfb1 to Vfb4, and inputs decision signal Vch (i.e. the decision result) to switching controlling section 41.

Figure 4:
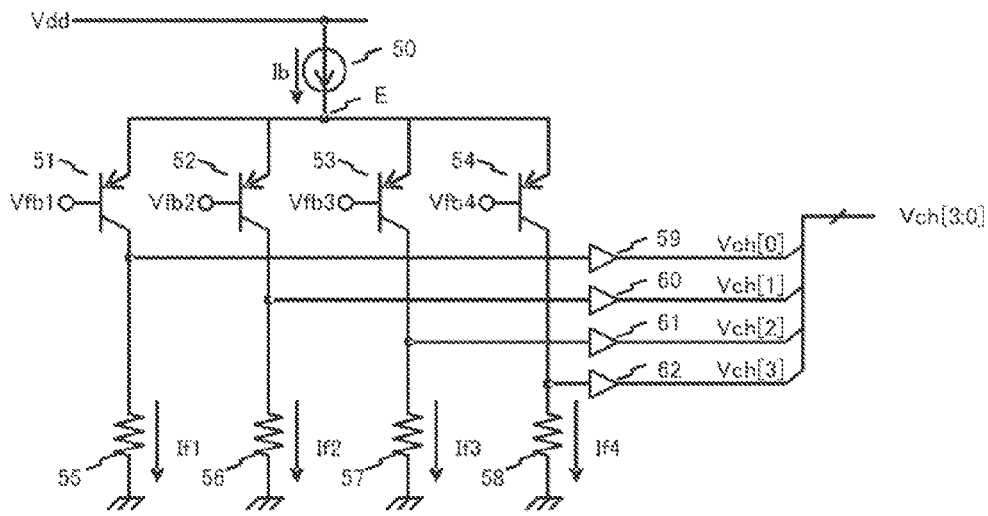
FIG. 4 is a circuit diagram showing a specific configuration of VF deciding section 40.

FIG. 4 is a specific configuration example of VF deciding section 40. Cathode terminal voltages Vfb1 to Vfb4 of constant current sources 21 to 24 connect to base terminals of pnp transistors 51 to 54, respectively. The emitter terminals of pnp transistors 51 to 54 are short-circuited in contact point E. Constant current source 50 that applies constant current Ib is connected between power supply Vdd and contact point E. Resistances 55 to 58 are connected between collector terminals and grounds of pnp transistors 51 to 54, respectively, and the voltages of the collector terminals are converted into predetermined logic level voltages Vch[0] to Vch[3] through buffer circuits 59 to 62.

With the circuit shown in FIG. 4, current Ib of constant current source 50 flows to the pnp transistor connected to the minimum voltage among cathode terminal voltages Vfb1 to Vfb4. Consequently, by monitoring each collector voltage, it is possible to specify the minimum cathode terminal voltages among cathode terminal voltages Vfb1 to Vfb4. The acquired information is outputted to switching controlling section 41 as 4-bit decision signal Vch[3:0].

Switching controlling section 41 generates control signals Vsel1 to Vsel3 based on the inputted decision signal Vch, and inputs control signals Vsel1 to Vsel3 to switching circuits 30 and 31 and current controlling section 42, respectively. Switching controlling section 41 is formed with, for example, a logic circuit or a microcomputer.

Current controlling section 42 generates control signal Vcnt for individually controlling constant current sources 21 to 24 on and off, based on control signal Vsel3, and inputs control signal Vcnt to constant current sources 21 to 24.

The light emitting element drive apparatus according to Embodiment 1 of the present invention divides LED array loads into groups based on variability between forward voltage drops of the LED array loads. Then, a plurality of LED array load groups acquired as a result of grouping are shared between a plurality of voltage converting circuits. That is, a certain voltage converting circuit drives LED array loads belonging to a certain LED array load group, and another voltage converting circuit drives LED array loads belonging to another LED array load group. By driving LED array loads in this way, it is possible to reduce the amount of variability between forward voltage drops in LED array load groups connected to each voltage converting circuit, and, consequently, realize reduction in power consumption.

Figure 5:
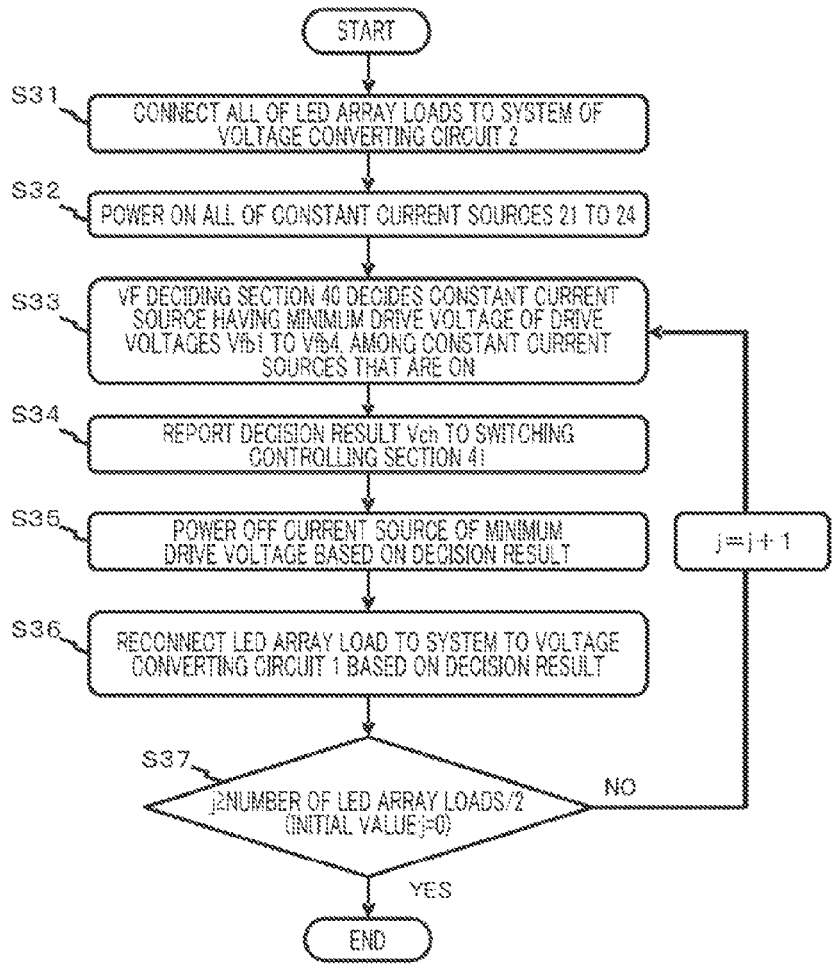
FIG. 5 is a flowchart showing an operation sequence of switching controlling section 41 in a light emitting element drive apparatus according to Embodiment 1 of the present invention.

An example of an operation sequence of the light emitting element drive apparatus according to Embodiment 1 of the present invention will be explained using FIG. 5 to FIG. 7. With the light emitting element drive apparatus according to the present invention, the controlling section controls the switching section to connect all of light emitting element arrays to a same voltage applying section, and then controls the switching section to connect the light emitting element array producing the maximum forward voltage drop among the light emitting element arrays connected to this voltage applying section, to another voltage applying section. The following specific example illustrates the operation, and assumes that the relationship between the forward voltage drops of LED array loads 11 to 14 is "Vf1<Vf2<Vf3<Vf4."

First, switching circuits 30 and 31 are controlled to connect all of anode terminals P1H to P4H of LED array loads 11 to 14 to output terminal PO2 of voltage converting circuit 2, and connect cathode terminals P1L to P4L to minimum value detecting circuit 34. That is, all of LED array loads 11 to 14 connect to the system of voltage converting circuit 2 (i.e. the voltage applying section including voltage converting circuit 2) (step S31). The equivalent circuit configuration in this case is as shown in FIG. 6. Then, constant current sources 21 to 24 are all powered on to drive all of LED array loads 11 to 14 (step S32).

In this case, all of LED array loads 11 to 14 connect to voltage converting circuit 2. Therefore, if all of constant current sources 21 to 24 are powered on, voltage converting circuit 2 is required to output a significant current. Hence, in the operation sequence of reconnecting LEDs, burden on voltage converting circuit 2 may be reduced by decreasing LED current values compared to a normal operation sequence of LEDs.

Next, VF deciding section 40 decides which constant current source is driven by the minimum cathode terminal voltage, by detecting minimum cathode terminal voltage Vfb4 among cathode terminal voltages Vfb1 to Vfb4 at constant current sources 21 to 24 that are on (step S33). Then, VF deciding section 40 reports the decision result (i.e. decision signal Vch) to switching controlling section 41 (step S34).

Switching controlling section 41 inputs control signal Vsel3 generated based on the decision result, to current controlling section 42, and current controlling section 42 powers off constant current source 24 to which minimum cathode terminal voltage Vfb4 applies (step S35).

Further, switching controlling section 41 controls switching circuits 30 and 31 according to control signals Vsel1 and Vsel2, and switches the connection related to LED array load 14 having minimum cathode terminal voltage Vfb4 (that is, the maximum forward voltage drop) (step S36). To be more specific, switching controlling section 41 switches the connection destination of anode terminal P4H of LED array load 14, from output terminal PO2 of voltage converting circuit 2 to output terminal PO1 of voltage converting circuit 1. Further, switching controlling section 41 switches the connection destination of cathode terminal P4L, from minimum value detecting section 34 to minimum value detecting section 32.

Step S33 to step S36 repeat a number of times corresponding to half the number of LED array loads (step S37). With the present embodiment, the number of LED array loads is four, and therefore step S33 to step S36 repeat twice. Steps S33 to S36 have been performed only once so far, and therefore wily be performed only one more time. In this case, the rest of constant current sources 21 to 23 except constant current source 24 are powered on; and therefore step S33 to step S36 are performed with respect, to constant current sources 21 to 23.

To be more specific, by detecting the minimum value among cathode terminal voltages Vfb1 to Vfb3 at the respective constant current sources, VF deciding section 40 decides the constant current source to which the minimum cathode terminal voltage applies, and reports the decision result (i.e. decision signal Vch) to switching controlling section 41.

Switching controlling section 41 inputs control signal Vsel3 generated based on the resulting decision result (i.e. decision signal Vch), to current controlling section 42, and current controlling section 42 powers off constant current source 23 driven by minimum cathode terminal voltage Vfb3. Further, switching controlling section 41 controls switching circuits 30 and 31 according to control signals Vsel1 and Vsel2, and switches the connection related to LED array load 13 having minimum cathode terminal voltage Vfb3 (that is, the maximum forward voltage drop). To be more specific, switching controlling section 41 switches the connection destination of anode terminal P3H of LED array load 13, from output terminal PO2 of voltage converting circuit 2 to output terminal PO1 of voltage converting circuit 1. Further, switching controlling section 41 switches the connection destination of cathode terminal P3L from minimum value detecting section 34 to minimum value detecting section 32.

Thus, by detecting and sequentially powering off the constant current sources to which the minimum cathode terminal voltage applies, it is possible to sequentially extract a greater forward voltage drop from a plurality of LED array loads and switch the connections of LED array loads by switching circuits 30 and 31.

Figure 7:
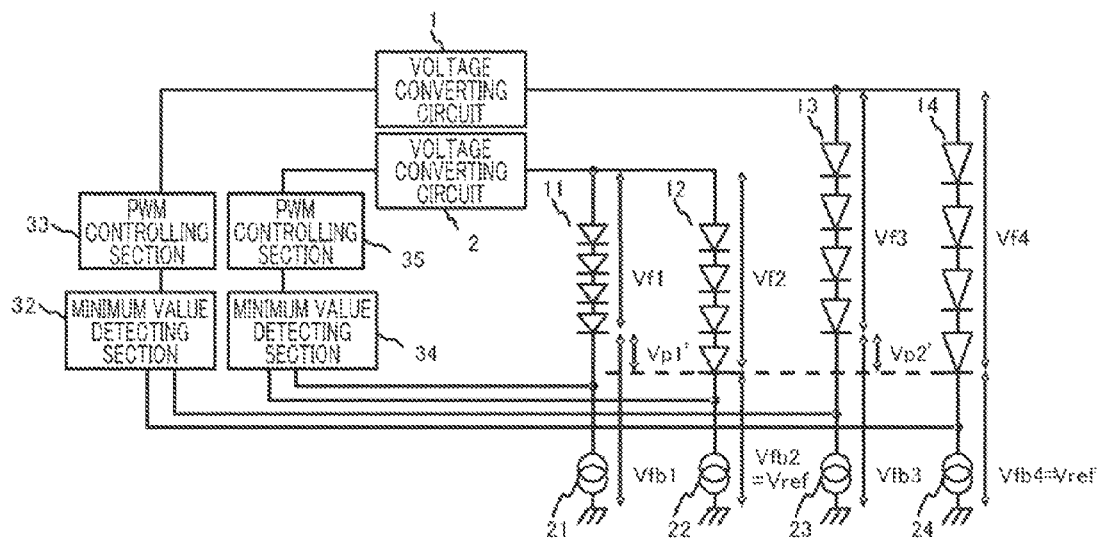
FIG. 7 illustrates a state after LED array loads are reconnected.

As described above, by deciding cathode terminal voltages and switching connections of LED array loads only a number of times corresponding to half the total number of LED array loads, it is possible to sort an equal number of LED array loads to two voltage converting circuits 1 and 2 based on the magnitudes of forward voltage drops (see FIG. 7).

Figure 6:
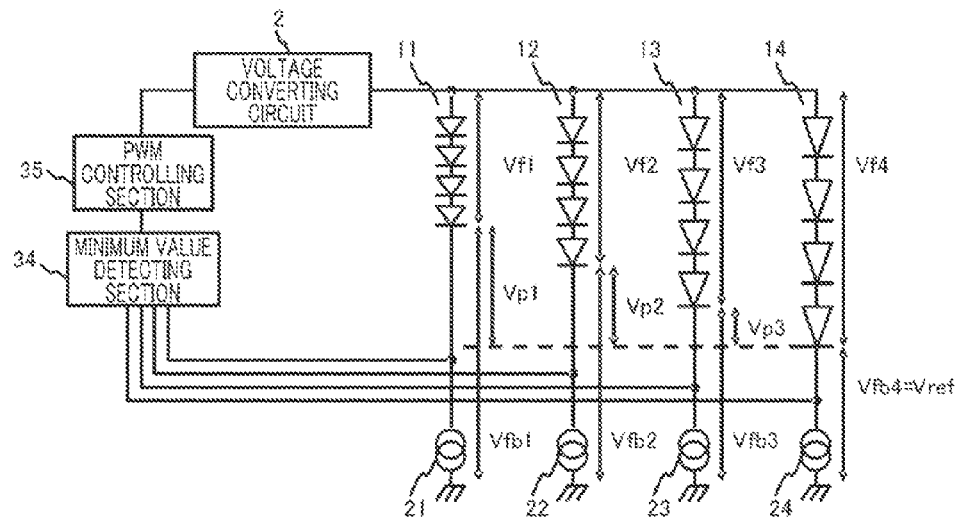
FIG. 6 illustrates a state before LED array loads are reconnected.

As described above, by reconnecting LED array loads between a plurality of voltage converting circuits, based on cathode terminal voltages Vfb1 to Vfb4 of the LED array loads, it is possible to reduce the total value of voltages Vp1 to Vp3 corresponding to variability between forward voltage drops Vf1 to Vf4 of the LED array loads shown in FIG. 6, to the total value of voltages VP1' and VP2' corresponding to the variability shown in FIG. 7. Consequently, it is possible to reduce power consumption. To illustrate using specific numbers, for example, Vf1, Vf2 Vf3 and Vf4 are 10V, 11V, 12V and 13V, respectively. In this case, Vp1, Vp2 and Vp3 shown in FIG. 6 are 3V, 2V and 1V, respectively, and the total value is 6V. By contrast with this, Vp1' and Vp2' shown in FIG. 7 are both 1V, and the total value is 2V. Thus, according to the present embodiment, regardless of in what combination LED array loads connect to a plurality of converters, it is possible to reconnect the LED array loads to minimize power consumption as shown in FIG. 7, by performing the above-described control.

Further, by minimizing power consumption, it is possible to use a package of the light emitting element drive apparatus with a little allowable power dissipation, and reduce the cost of the IC and reduce the cost of the mounting substrate. Further, it is also possible to contribute to the reduction in the amount of work required to select the variability between LEDs.

Further, with the present embodiment, an example of the above operation sequence assumes that the number of reconnections is made half (i.e. twice with the present embodiment) the number of LED array loads to make the number of LED array loads connected to voltage converting circuits 1 and 2 substantially the same. However, the number of reconnections for realizing the functions of the present invention is not limited to this. Note that, by making the number of reconnections two, it is possible to make the number of LED array loads connected to each voltage applying section equal and make the loads of the voltage applying sections equal. More generally, if the total number of voltage applying sections is M and the total number of light emitting arrays to connect is N, N/M light emitting element arrays only need to connect to one voltage applying section. Consequently, by repeating reconnection processing N/M times with respect to one voltage applying section, it is possible to make the number of light emitting element arrays to connect to one voltage applying section optimal to make the loads equal. Here, M and N are positive integers and M<N.

Further, with an example of the above operation sequence, once VF deciding section 40 makes decision, LED array loads are reconnected based on the decision result (i.e. decision signal Vch). However, after decision is made a plurality of times or after all decisions are finished, switching controlling section 41 may finally reconnect LED array loads by controlling switching circuits 30 and 31. Then, by storing every decision result (i.e. decision signal Vch) in switching controlling section 41, it is possible to assign LED array loads desirably.

Further, VF deciding section 40 may decide the maximum value, instead of the minimum value, among cathode terminal voltages Vfb1 to Vfb4. That is, VF deciding section 40 specifies the constant current source to which the maximum cathode terminal voltage applies, and reports the decision result (i.e. decision signal Vch) to switching controlling section 41. In this case, by repeating a predetermined number of times the operation of powering off the constant current source to which the maximum cathode terminal voltage applies, based on the resulting decision result (i.e. decision signal Vch), switching controlling section 41 can also select each LED array load. In other words, it is equally possible to control the switching section to connect the light emitting element array producing the minimum forward voltage drop among the light emitting element arrays connected to a voltage applying section, to another voltage applying section.

Further, although the light emitting element drive apparatus according to Embodiment 1 employs a configuration in which voltage converting circuit 1 is a boost converter that converts predetermined input voltage Vcc into a higher voltage than predetermined input voltage Vcc and outputs the voltage, as long as output voltages Vout1 and Vout2 sufficient for LED array loads to emit light are acquired, the light emitting element drive apparatus may employ a configuration of a buck converter that converts predetermined input voltage Vcc into a lower voltage than predetermined voltage Vcc and outputs the voltage, or may employ a configuration of a buck-boost converter that can convert voltage into a lower or higher voltage than predetermined voltage Vcc and output the voltage.

Further, although, with the present embodiment, each LED array load (i.e. light emitting array) employs a configuration connecting four LEDs in series, the present invention is not limited to this. The present invention is applicable when the number of LEDs is one or more. That is, one light emitting element array is formed with one or more light emitting elements.

Embodiment 2

Figure 8:
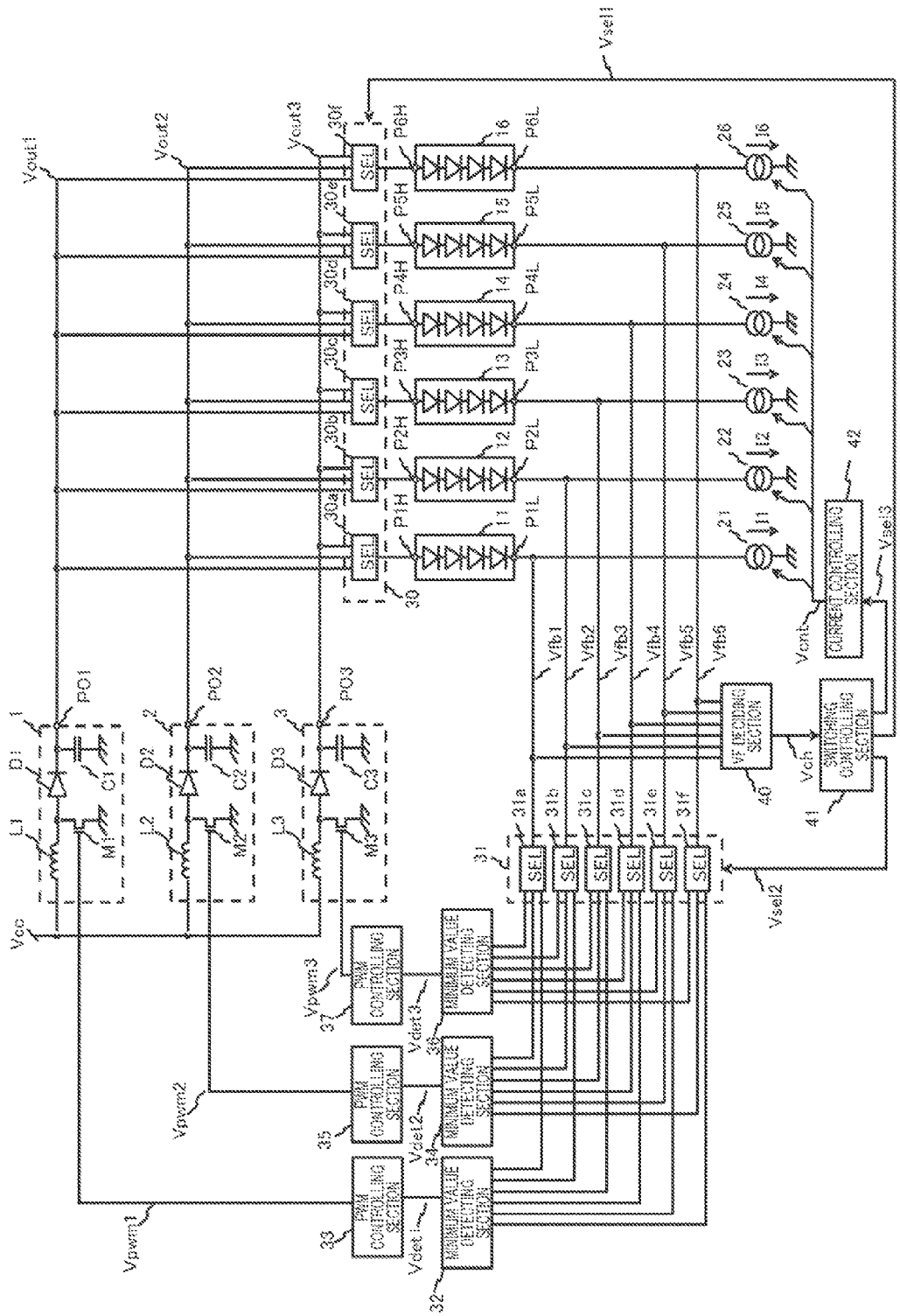
FIG. 8 is a block diagram showing an overall configuration example of a light emitting element drive apparatus according to Embodiment 2 of the present invention.

The light emitting element drive apparatus according to Embodiment 2 of the present invention will be explained using FIG. 8 and FIG. 9. The light emitting element drive apparatus according to Embodiment 2 differs from the light emitting element drive apparatus according to Embodiment 1 primarily in additionally having voltage converting circuit 3, LED array loads 15 and 16, constant current sources 25 and 26, selectors 30e to 30f, selectors 31e to 31f, minimum value detecting section 36 and PWM controlling section 37. FIG. 8 is a block diagram showing an overall configuration example of the light emitting element drive apparatus according to Embodiment 2.

Voltage converting circuit 3 is a boost switching power supply, and is formed with coil L3, diode D3, transistor M3 and capacitor C3. Voltage converting circuit 3 boosts predetermined input voltage Vcc to voltage Vout3 required to drive LED array loads 11 to 14, based on control signal Vpwm3 from PWM controlling section 37, and outputs voltage Vout3.

Switching circuit 30 is a selector circuit group including selectors 30a to 30f. Switching circuit 30 connects each one of anode terminals P1H to P6H of LED array loads 11 to 16 to one of output terminal PO1 of voltage converting circuit 1, output terminal PO2 of voltage converting circuit 2 and output terminal PO3 of voltage converting circuit 3, based on control signal Vsel1 from switching controlling section 41. Selectors 30a to 30f are formed with, for example, MOS switches.

Constant current sources 25 and 26 connect to cathode terminals P5L to P6L of LED array loads 15 and 16 in series, respectively, and supply constant currents I5 and I6 required by LEDs to emit light, to LED array loads 15 and 16.

Constant current sources 25 and 26 can perform an on/off control based on control signal Vcnt from current controlling section 42, and adjusts the proportion of the duration of "on" and the duration of "off." By this means, it is possible to adjust the amount of current to supply to LED array loads 15 and 16 and control the amount of light emitted from LEDs.

Switching circuit 31 is a selector circuit group including selectors 31a to 31f. Switching circuit 31 connects each one of cathode terminal voltages Vfb1 to Vfb6 to one of minimum value detecting section 32, minimum value detecting section 34 and minimum value detecting section 36, based on control signal Vsel2 from switching controlling section 41. Selectors 31a to 31f are formed with, for example, MOS switches. Cathode terminal voltages Vfb1 to Vfb6 of LED array loads 11 to 16 are determined based on forward voltage drops of LED array loads 11 to 16.

Minimum value detecting section 36 selects the minimum voltage among the cathode terminal voltages connected in switching circuit 31, and inputs the minimum voltage to PWM controlling section 37 as detected voltage Vdet3. Detected voltage Vdet3 needs not to be the same voltage as the selected minimum cathode terminal voltage, and may be generated based on, for example, a minimum voltage among the cathode voltages shifted by a predetermined voltage.

PWM controlling section 37 compares inputted detected voltage Vdet3 and reference signal Vref (not shown). Based on this comparison result, control signal Vpwm3 is inputted to the gate of transistor M3 of voltage converting circuit 3 to make detected voltage Vdet3 equal to reference voltage Vref. Based on this control signal Vpwm3, voltage converting circuit 3 switches transistor M3, and generates output voltage Vout3.

VF deciding section 40 decides the magnitude of forward voltage drop is greater among LED array loads 11 to 16, based on inputted cathode terminal voltages Vfb1 to Vfb6, and inputs decision signal Vch (i.e. the decision result) to switching controlling section 41.

The other configurations and operations are the same as in Embodiment 1, and therefore explanation thereof will be omitted.

According to Embodiment 2 of the present invention, LED array loads 11 to 16 are classified into three groups based on the magnitudes of forward voltage drops, and the three classified LED array load groups are respectively driven by three voltage converting circuits 1 to 3. That is, compared to the case where the light emitting element drive apparatus that drives LED array loads by two voltage converting circuits as described in Embodiment 1, it is possible to reduce the range of variability between forward voltage drops in the LED array load groups connected to each voltage converting circuit. Consequently, it is possible to realize further reduction in power consumption.

Figure 9:
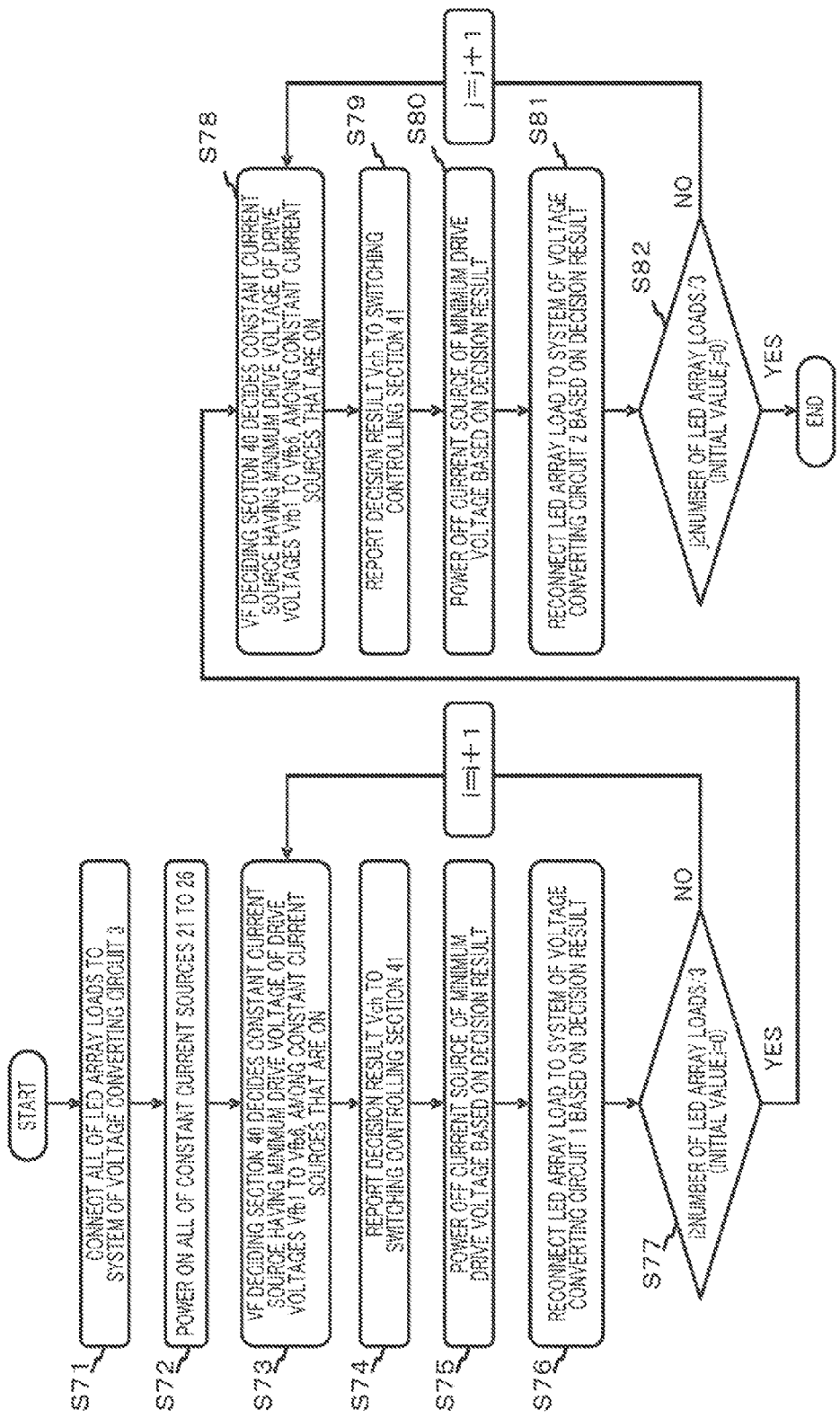
FIG. 9 is a flowchart showing an operation sequence of switching controlling section 41 in a light emitting element drive apparatus according to Embodiment 2 of the present invention.

The operation sequence of the light emitting element drive apparatus according to Embodiment 2 of the present invention will be briefly explained using the flowchart shown in FIG. 9. This operation differs from the operation of Embodiment 1 shown in FIG. 5 in classifying LED array loads into three groups instead of two groups, and assigning the respective groups to three voltage converting circuits 1 to 3.

First, all of anode terminals P1H to P6H of LED array loads connect to output terminal PO3 of voltage converting circuit 3, and cathode terminals P1L to P6L connect to minimum value detecting circuit 36. That is, all of LED array loads 11 to 16 connect to the system of voltage converting circuit 3 (i.e. the voltage applying section including voltage converting circuit 3) (step S71). Then, constant current sources 21 to 26 are all powered on to drive all of LED array loads 11 to 16 (step S72).

Next, VF deciding section 40 decides the constant current source to which the minimum cathode terminal voltage applies, among constant current sources that are on (step S73). Then, VF deciding section 40 reports the decision result (i.e. decision signal Vch) to switching controlling section 41 (step S74).

Switching controlling section 41 powers off the constant current source to which the minimum cathode terminal voltage applies, through current controlling section 42 (step S75). Further, switching controlling section 41 controls switching circuits 30 and 31 to switch the connection destination of the LED array load connected to the constant current source that is powered off, from the system of voltage converting circuit 3 to the system of voltage converting circuit 1 (step S76).

Then, with respect to the rest of the constant current sources that are on and LED array loads, decision is made and the connection is switched to voltage converting circuit 1 repeatedly as described above a number of times corresponding to one third of the total number of LED array loads (step S77).

Next, with respect to the rest of the constant current sources that are on and LED array loads corresponding to two third of the total number of LED array loads, the same operations as in above steps S73 to S77 are performed (steps S78 to S82). Note that, in steps S78 to S82, the connection destination of the LED array load connected to the constant current source that is powered off switches from the system of voltage converting circuit 3 to the system of voltage converting circuit 2.

In this way, all of LED array loads are classified into three groups each including an equal number of LED array loads (corresponding to one third of the total number of LED array loads) based on the magnitudes of forward voltage drops. To be more specific, it is possible to assign all of LED array loads producing greater forward voltage drops, to voltage converting circuit 1, voltage converting circuit 2 and voltage converting circuit 3.

Further, an example of the above operation sequence assumes that the number of reconnections is made one third (i.e. three times with the present embodiment) of the number of LED array loads to make the number of LED array loads connected to voltage converting circuits 1 and 3 substantially the same. However, the number of reconnections for realizing the functions of the present invention is not limited to this.

Note that, by making the number of reconnections three, it is possible to make the number of LED array loads connected to each voltage applying section equal and make the loads of the voltage applying sections equal. More generally, if the total number of voltage applying sections is M and the total number of light emitting arrays to connect is N, N/M light emitting element arrays only need to connect to one voltage applying section. Consequently, by repeating reconnection processing N/M times with respect to one voltage applying section, it is possible to make the number of light emitting element arrays to connect to one voltage applying section optimal to make the loads equal. Further, by repeating this processing N/M times, then changing a voltage applying section as a the connection switching destination and repeating the processing again, it is possible to connect an equal number of light emitting element arrays to each voltage applying section. Furthermore, in case where the number of voltage applying sections increases, by repeating this processing of changing the voltage applying section of the connection switching destination (M−2) times, it is possible to connect all of light emitting element arrays equally to all of voltage applying sections. Here, M and N are positive integers and M<N.

Further, with an example of the above operation sequence, once VF deciding section 40 makes decision, LED array loads are reconnected based on the decision result (i.e. decision signal Vch). However, after decision is made a plurality of times or after all decisions are finished, switching controlling section 41 may finally reconnect LED array loads by controlling switching circuits 30 and 31. Then, by storing every decision result (i.e. decision signal Vch) in switching controlling section 41, it is possible to assign LED array loads desirably.

Further, VF deciding section 40 may decide the constant current source to which the maximum cathode terminal voltage applies, by deciding the maximum value among cathode terminal voltages Vfb1 to Vfb6, and report the decision result (i.e. decision signal Vch) to switching controlling section 41. In this case, by repeating a predetermined number of times the operation of powering off the constant current source to which the maximum cathode terminal voltage applies, based on the resulting decision result (i.e. decision signal Vch), switching controlling section 41 can also select each LED array load.

Further, although, with the light emitting element drive apparatus according to Embodiment 2, the number of voltage converting circuits and the number of groups to classify LED array loads into based on the magnitudes of forward voltage drops, are both three, the circuit configuration of realizing the function of the present invention is not limited to this. That is, by classifying LED array loads into four groups in the same manner Embodiment 1 is applied to Embodiment 2, it is possible to further reduce the range of variability between forward voltage drops of LED array loads in each voltage converting circuit. Consequently, it is possible to realize further reduction in power consumption.

Embodiment 3

Figure 10:
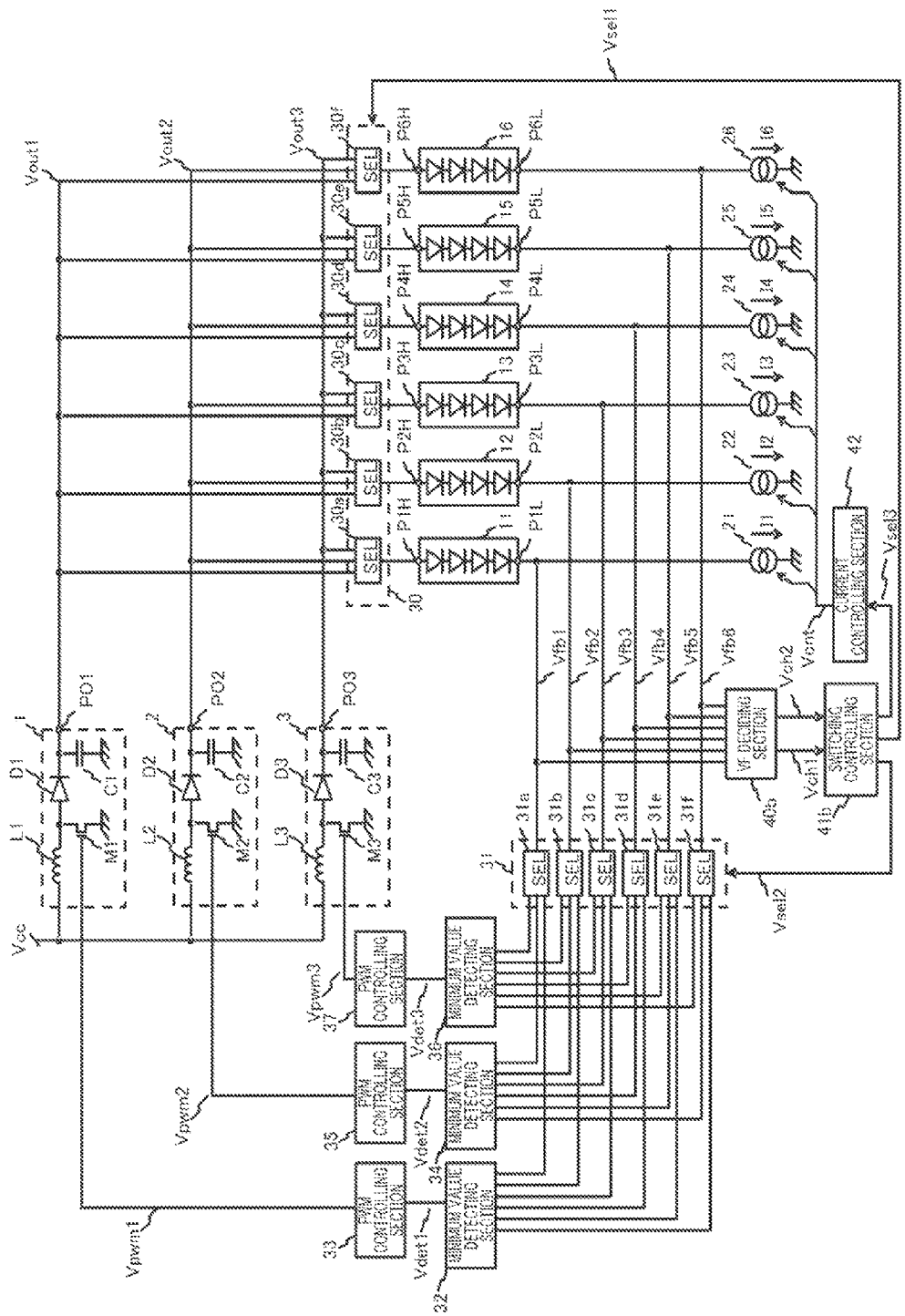
FIG. 10 is a block diagram showing an overall configuration example of a light emitting element drive apparatus according to Embodiment 3 of the present invention.

The light emitting element drive apparatus according to Embodiment 3 of the present invention will be explained using FIG. 10. The light emitting element drive apparatus according to Embodiment 3 differs from the light emitting element drive apparatus according to Embodiment 2 primarily in providing VF deciding section 40b different from VF deciding section 40 and switching controlling section 41b different from switching controlling section 41. FIG. 10 is a block diagram showing an overall configuration example of the light emitting element drive apparatus according to Embodiment 3. In the light emitting element drive apparatus according to the present embodiment, the controlling section controls the switching section to connect all of light emitting element arrays to the same voltage applying section, and then controls the switching section to connect the light emitting element array producing the maximum forward voltage drop among the light emitting element arrays connected to this voltage applying section, to another voltage applying section, and connect the light emitting element array producing the minimum forward voltage drop among the light emitting element array connected to this voltage applying section, to yet another voltage applying section. Hereinafter, the details will be explained using a specific configuration.

VF deciding section 40b differs from VF deciding section 40 according to Embodiment 0.2 in deciding, at the same time, the constant current source to which the minimum cathode terminal voltage among cathode terminal voltages Vfb1 to Vfb6 applies, and the constant current source to which the maximum cathode terminal voltage applies. VF deciding section 40b decides the constant current source to which the minimum cathode terminal voltage among the constant current sources that are on applies, and reports the decision result to switching controlling section 41b as decision signal Vch1. Further, VF deciding section 40b decides the constant current source to which the maximum cathode terminal voltage among the constant current sources that are on applies, and reports the decision result to switching controlling section 41b as decision signal Vch2.

Switching controlling section 41b differs from switching controlling section 41 according to Embodiment 2 in switching at the same time a plurality of LED array loads to two or more different voltage converting circuits. Switching controlling section 41b generates control signals Vsel1 to 3 based on the inputted decision results (i.e. decision signals Vch1 and Vch2), and controls switching circuits 30 and 31 and current controlling section 42 based on control signals Vsel1 to 3.

The other configurations and operations are the same as in Embodiment 2, and therefore explanation thereof will be omitted.

Once VF deciding section 40b makes decision, the light emitting element drive apparatus according to the present embodiment can perform the operation of switching two LED array loads between systems (i.e. voltage applying sections) of voltage converting circuits at the same time. Consequently, the light emitting element drive apparatus according to the present embodiment provides an advantage of reducing into about half the time required for a series of operations of classifying LED array loads into groups and assigning the LED array loads to a plurality of voltage converting circuits.

For example, first, all of LED array loads 11 to 16 connect to the system of voltage converting circuit 2 and all of constant current sources 21 to 26 are powered on to drive all of LED array loads 11 to 16. Here, assume that the magnitudes of cathode terminal voltages Vfb1 to Vfb6 of LED array loads 11 to 16 are Vfb1>Vfb2>Vfb3>Vfb4>Vfb5>Vfb6.

VF deciding section 40b reports to switching controlling section 41b the decision result (i.e. decision signal Vch1) that cathode terminal voltage Vfb6 at constant current source 26 is minimum among the constant current sources that are on and the decision result (i.e. decision signal Vch2) that cathode terminal voltage Vfb1 at constant current source 21 is maximum.

Switching controlling section 41b powers off constant current source 21 to which maximum cathode terminal voltage Vfb1 applies and constant current source 26 to which minimum cathode terminal voltage Vfb6 applies, through current controlling section 42. Further, switching controlling section 41b controls switching circuits 30 and 31 based on the decision result (i.e. decision signal Vch1), and switches the connection related to LED array load 16 having minimum cathode terminal voltage Vfb6. To be more specific, switching controlling section 41b switches the connection destination of LED array load 16 from the system of voltage converting circuit 2 to the system of voltage converting circuit 1. Further, switching controlling section 41b controls switching circuits 30 and 31 based on the decision result (i.e. decision signal Vch2) to switch the connection related to LED array load 11 having maximum cathode terminal voltage Vfb1. To be more specific, switching controlling section 41b switches the connection destination of LED array load 11 from the system of voltage converting circuit 2 to the system of voltage converting circuit 3.

If a series of operations from the decision in VF decision circuit 40b to the switching of connections of LED array loads repeat one more time, LED array loads are classified into groups two by two in descending order of LED array loads producing greater forward voltage drops, and respectively assigned to voltage converting circuit 1, voltage converting circuit 2 and voltage converting circuit 3.

While the decision operations need to be performed four times with respect to six LED array loads in total with Embodiment 2, it is possible to finish the operation of assigning LED array loads only by performing decision operations twice with Embodiment 3.

Further, an example of the above operation sequence assumes that the number of reconnections is made one third (i.e. three times with the present embodiment) of the number of LED array loads to make the number of LED array loads connected to voltage converting circuits 1 and 3 substantially the same. However, the number of reconnections for realizing the functions of the present invention is not limited to this. Note that, by making the number of reconnections three, it is possible to make the number of LED array loads connected to each voltage applying section equal and make the loads of the voltage applying sections equal. More generally, if the total number of voltage applying sections is M and the total number of light emitting arrays is N, N/M light emitting element arrays only need to connect to one voltage applying section. Consequently, by repeating reconnection processing N/M times with respect to one voltage applying section, it is possible to make the number of light emitting element arrays to connect to one voltage applying section optimal to make the loads equal. Further, although not required with the present embodiment, in case where the number of voltage applying sections increases, the above-described processing repeats N/M times, then the voltage applying section of the connection switching destination changes and the above-described processing repeats again. By this means, it is possible to connect an equal number of light emitting element arrays to each voltage applying section. Here, M and N are positive integers and M<N.

As described above, the light emitting element drive apparatus according to the present embodiment provides an advantage of reducing the time required by a series of operations of assigning LED array loads.

Embodiment 4

Figure 11:
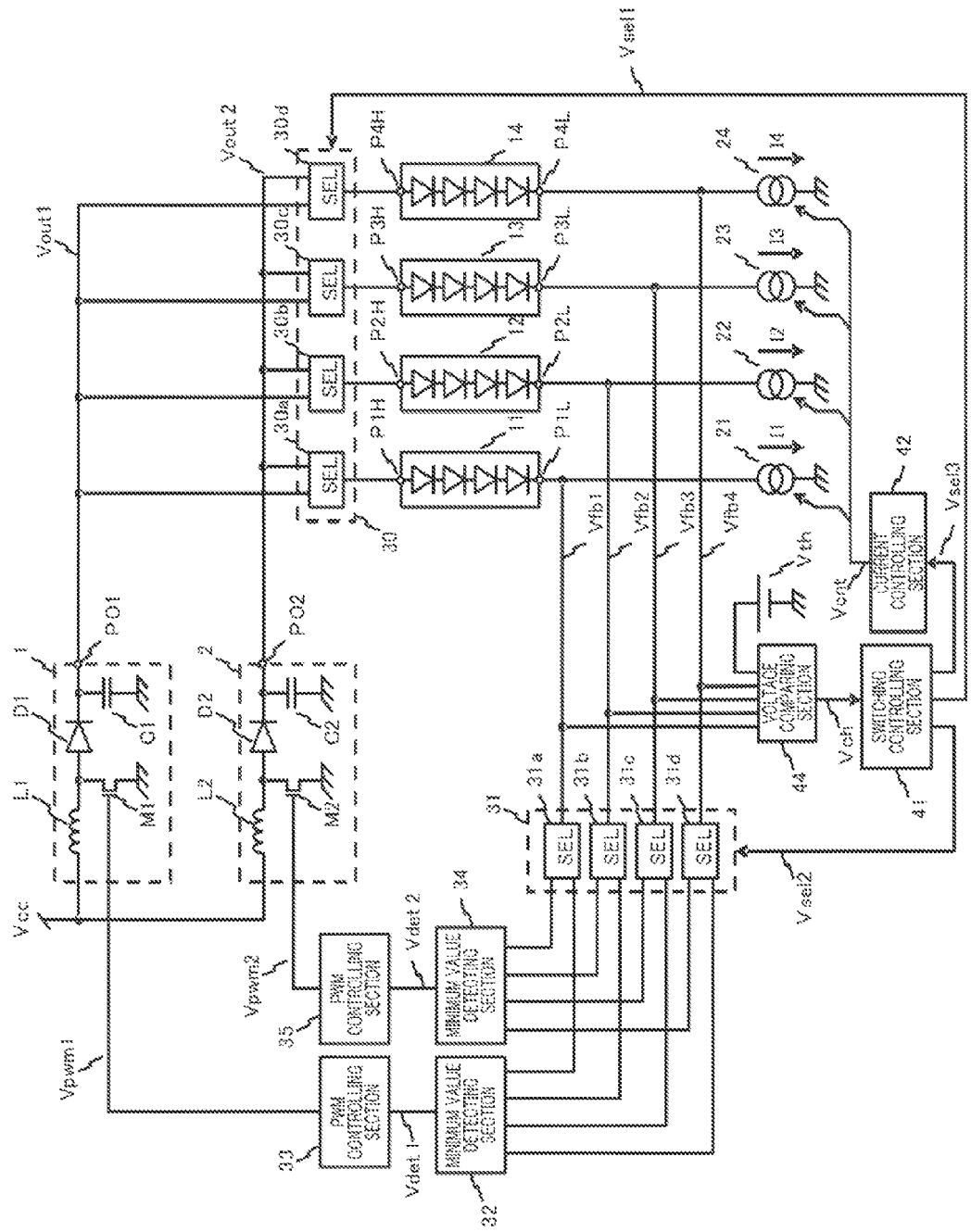
FIG. 11 is a block diagram showing an overall configuration example of a light emitting element drive apparatus according to Embodiment 4 of the present invention.
Figure 12:
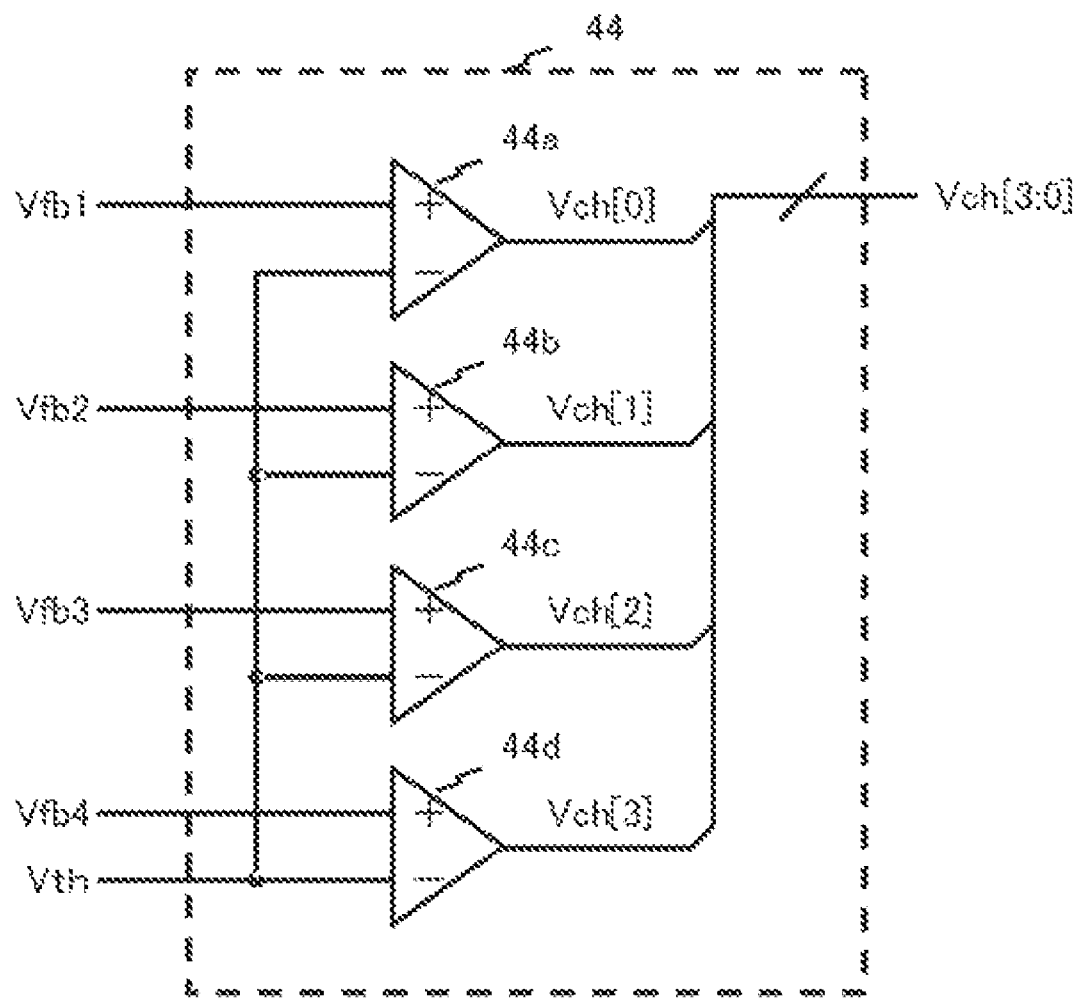
FIG. 12 is a circuit diagram showing a specific configuration of voltage comparing section 44.

The light emitting element drive apparatus according to Embodiment 4 of the present invention will be explained using FIG. 11 and FIG. 12. The light emitting element drive apparatus according to the present embodiment differs from the light emitting element drive apparatus according to Embodiment 1 primarily in providing voltage comparing section 44 different from VF deciding section 40, and newly providing threshold voltage Vth. FIG. 11 is a block diagram showing an overall configuration example of the light emitting element drive apparatus according to Embodiment 4. With the present embodiment, the controlling section controls the switching section to connect all of light emitting element arrays to a same voltage applying section, and then controls the switching section to compare a predetermined threshold voltage and current source voltages at a plurality of current sources connected to cathode terminals of the light emitting element arrays and connect light emitting element arrays having current source voltages greater than the threshold voltage, to another voltage applying section. Hereinafter, the details will be explained using a specific configuration.

Voltage comparing section 44 compares cathode terminal voltages Vfb1 to Vfb4 and predetermined threshold voltage Vth, and reports the resulting comparison result (i.e. decision signal Vch) to switching controlling section 41. Voltage comparing section 44 is realized by a configuration of comparing cathode terminal voltages Vfb1 to Vfb4 and threshold voltage Vth in comparators 44a to 44d, respectively, as shown in, for example, FIG. 12.

The other configurations and operations are the same as in Embodiment 1, and therefore explanation thereof will be omitted.

An example of an operation sequence of the light emitting element drive apparatus according to Embodiment 4 of the present invention will be explained below. First, switching circuit 30 is controlled to connect all of anode terminals P1H to P4H of LED array loads 11 to 14, to output terminal PO1 of voltage converting circuit 1.

Further, switching circuit 31 is controlled to connect all of cathode terminals P1L to P4L of LED array loads 11 to 14, to minimum value detecting section 32.

That is, all of LED array loads 11 to 14 connect to the system of voltage converting circuit 1 (i.e. the voltage applying section including voltage converting circuit 1).

Next, voltage comparing section 44 compares cathode terminal voltages Vfb1 to Vfb4 and threshold voltage Vth, and reports the comparison result to switching controlling section 41. Assume that Vfb1>Vfb2>Vth>Vfb3>Vfb4 as an example.

Based on the comparison result (i.e. decision signal Vch), switching controlling section 41 powers off constant current sources 21 and 22 to which cathode terminal voltages Vfb1 and Vfb2 greater than threshold voltage Vth apply, through current controlling section 42. Further, switching circuits 30 and 31 are controlled to switch the connection destinations of LED array loads 11 and 12 from the system of voltage converting circuit 1 to the system of voltage converting circuit 2.

By performing the above-described operation, it is possible to classify LED array loads 11 to 14 based on the magnitudes of forward voltage drops, and assign LED array loads 11 to 14 to voltage converting circuit 1 and voltage converting circuit 2.

Consequently, it is possible to reduce variability between forward voltage drops of LED array loads connected to predetermined voltage converting circuits and, consequently, reduce power consumption in the light emitting element drive apparatus.

Further, with the present embodiment, there are cases where the number of LED array loads connected to each voltage converting circuit does not become equal depending on the value of threshold voltage Vth. Note that, once voltage comparing section 44 compares cathode terminal voltages Vfb1 to Vfb4 and threshold voltage Vth, the above configuration and operation allow LED array loads to be classified, and, consequently, provide an advantage of reducing the time required to assign LED array loads.

Further, a configuration is employed with the present embodiment where the switching section is controlled to connect light emitting element arrays having greater current source voltages than the threshold voltage, to another voltage applying section. Note that a configuration is also possible in which the switching section is controlled to connect light emitting element arrays having smaller current source voltages than a threshold voltage, to another voltage applying section. This configuration can provide the same advantage. Further, a configuration is also possible in which the switching section is controlled to connect light emitting element arrays having current source voltages equal to a threshold voltage, to another voltage applying section.

Furthermore, a configuration is possible in which three or more voltage converting circuits are provided and a plurality of threshold voltages Vth are provided accordingly, and cathode terminal voltages are compared with a plurality of different threshold voltages Vth and LED array loads are assigned to three or more voltage converting circuits based on the comparison result.

Embodiment 5

Figure 13:
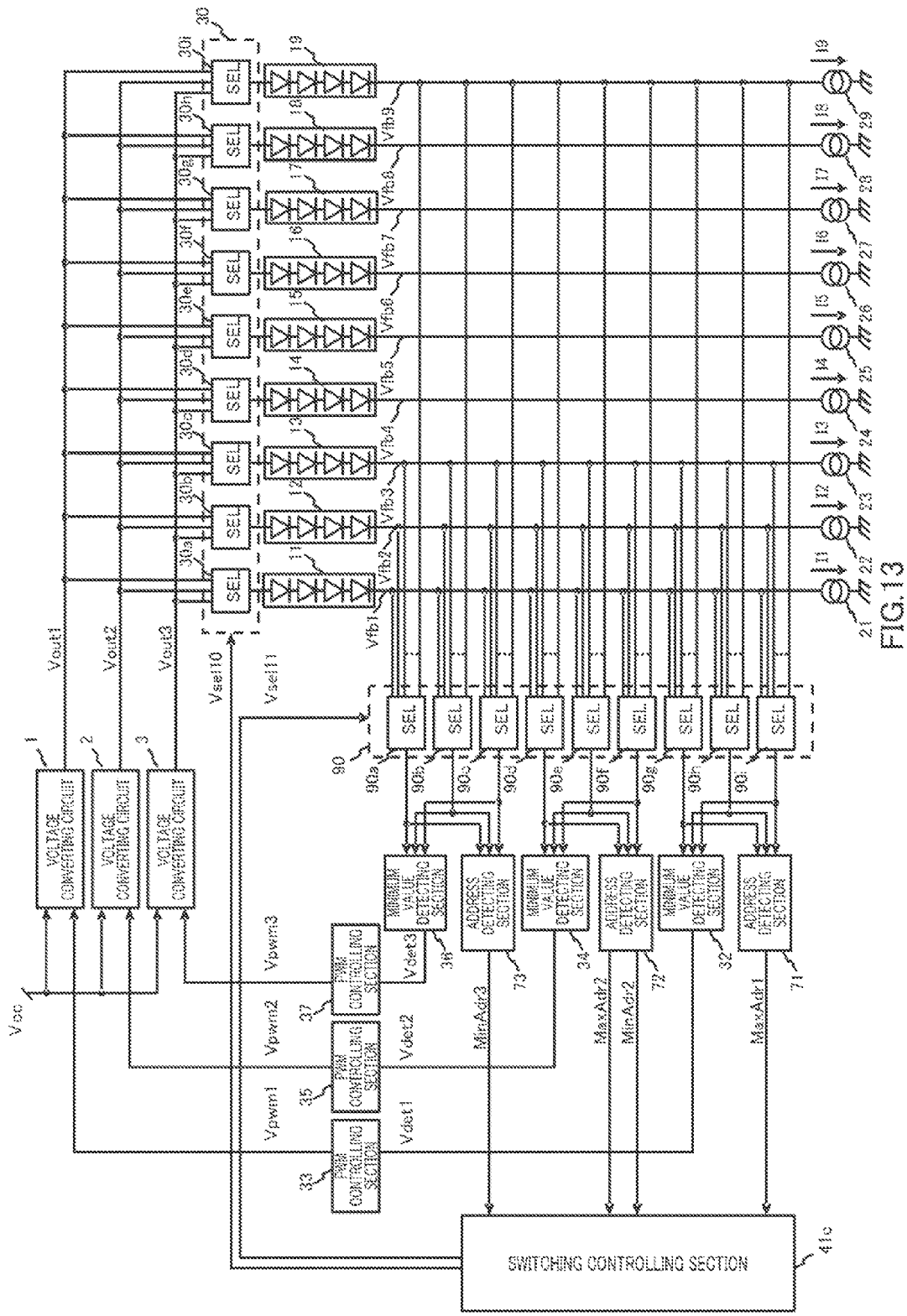
FIG. 13 is a block diagram showing an overall configuration example of a light emitting element drive apparatus according to Embodiment 5 of the present invention.

The light emitting element drive apparatus according to Embodiment 5 of the present invention will be explained using FIG. 13 and FIG. 14. The light emitting element drive apparatus according to the present embodiment differs from the light emitting element drive apparatus according to Embodiment 2 primarily in providing switching controlling section 41c different from switching controlling section 41 and switching circuit 90 different from switching circuit 31, and in additionally providing selectors 30g to 30i, LED array loads 17 to 19, constant current sources 27 to 29 and address detecting sections 71 to 73. FIG. 13 is a block diagram showing an overall configuration example of the light emitting element drive apparatus according to Embodiment 5. With the present embodiment, when the total number of voltage applying sections is M and the respective voltage applying sections are the first to the M-th voltage applying sections in the light emitting element drive apparatus, the controlling section controls the switching section to connect the light emitting array producing the maximum forward voltage drop among the light emitting element arrays connected to the N-th voltage applying section, to the (N−1)-th voltage applying section, and connect the light emitting element array producing the minimum forward voltage drop among the light emitting element arrays connected to the N-th voltage applying section, to the (N+1)-th voltage applying section. Note that, with the present embodiment, a configuration combining voltage converting circuit 1, minimum value detecting section 32 and PWM controlling section 33 is a specific example of one voltage applying section. Further, the configuration combining switching circuits 30 and 90 is a specific example of a switching section. Furthermore, the configuration combining switching controlling section 41c and address detecting circuits 71 to 73 is a specific example of the controlling section. Still further, LED array loads 11 to 19 are each a specific example of a light emitting element array. Hereinafter, the details will be explained using a specific configuration.

Switching circuit 30 is a selector circuit group including selectors 30a to 30i. Switching circuit 30 connects each one of anode terminals of LED array loads 11 to 19 to one of the output terminal of voltage converting circuit 1, the output terminal of voltage converting circuit 2 and the output terminal of voltage converting circuit 3, based on control signal Vsel10 from switching controlling section 41c. Selectors 30a to 30i are formed with, for example, MOS switches.

Constant current sources 21 to 29 connect to the cathode terminals of LED array loads 11 to 19 in series, respectively, and supply constant currents I1 to I9 required by the LEDs to emit light, to LED array loads 11 to 19. Constant current sources 21 to 29 are controlled on and off by, for example, a logic circuit or a microcomputer (not shown).

Switching circuit 90 is a selector circuit group including selectors 90a to 90i. Selectors 90a to 90c each connect one of cathode terminal voltages Vfb1 to Vfb9 of LED array loads 11 to 19 to minimum value detecting section 36 and address detecting section 73, based on control signal Vsel11 from switching controlling section 41c. Further, selectors 90d to 90f each connect one of cathode terminal voltages Vfb1 to Vfb9 of LED array loads 11 to 19 to minimum value detecting section 34 and address detecting section 72, based on control signal Vsel11 from switching controlling section 41c. Further, selectors 90g to 90h each connect one of cathode terminal voltages Vfb1 to Vfb9 of LED array loads 11 to 19 to minimum value detecting section 32 and address detecting section 71, based on control signal Vsel11 from switching controlling section 41c. Selectors 90a to 90i are formed with, for example, MOS switches.

Address detecting section 71 detects the string address of one specific LED array load among LED array loads 11 to 19, and inputs the string address to switching controlling section 41c as address signal MaxAdr1. Note that the LED array load with the string address of address signal MaxAdr1 is the LED array load having the maximum cathode terminal voltage among three cathode terminal voltages received as input in address detecting section 71 through selectors 90g, 90h and 90i. This is the LED array load producing the minimum forward voltage drop.

Address detecting section 72 detects the string addresses of two specific LED array loads among LED array loads 11 to 19, and inputs the string addresses to switching controlling section 41c as address signals MaxAdr2 and MinAdr2. Note that the LED array load with the string address of address signal MaxAdr2 is the LED array load having the maximum cathode terminal voltage among three cathode terminal voltages received as input in address detecting section 72 through selectors 90d, 90e and 90f. This is the LED array load producing the minimum forward voltage drop. Further, the LED array load with the string address of address signal MinAdr2 is the LED array load having the minimum cathode terminal voltage among three cathode terminal voltages received as input in address detecting section 72 through selectors 90d, 90e and 90f. This is the LED array load producing the maximum forward voltage drop.

Address detecting section 73 detects the string address of one specific LED array load among LED array loads 11 to 19, and inputs the string address to switching controlling section 41c as address signal MinAdr13. Note that the LED array load with the string address of address signal MinAdr3 is the LED array load having the minimum cathode terminal voltage among three cathode terminal voltages received as input in address detecting section 73 through selectors 90a, 90b and 90c. This is the LED array load producing the maximum forward voltage drop.

Here, a string address means address information for identifying each of LED array loads 11 to 19. Switching controlling section 41c associates the address information acquired from address detecting sections 71 to 73 with one of voltage converting circuits 1 to 3 to control switching circuits 30 and 90 and reconnect the LED array loads.

That is, switching controlling section 41c controls switching circuits 30 and 90 according to control signals Vsel10 and Vsel11 generated based on inputted address signals MaxAdr1, MaxAdr2, MinAdr2 and MinAdr3. To be more specific, the LED array load having the address indicated by address signal MaxAdr1 and the LED array load having the address indicated by address signal MinAdr2 are switched. Further, the LED array load having the address indicated by address signal MaxAdr2 and the LED array load having the address indicated by address signal MinAdr3 are switched. After LED array loads having the same address are repeatedly reconnected between voltage converting circuits a predetermined number of times, the reconnection control of LED array loads in these voltage converting circuits is finished. Switching circuit 41c is formed with, for example, a logic circuit or microcomputer.

The other configurations and operations are the same as in Embodiment 2, and therefore explanation thereof will be omitted.

According to the present embodiment, in a sequence different from Embodiment 2, LED array loads 11 to 19 are classified into three groups based on the magnitudes of forward voltage drops and the three classified LED array load groups are respectively driven by three voltage converting circuits 1 to 3. That is, a plurality of LED array load groups classified based on the magnitudes of forward voltage drops are shared between and driven by a plurality of voltage converting circuits. By this means, it is possible to reduce the amount of variability between forward voltage drops in the LED array load group connected to each voltage converting circuit, and realize reduction in power consumption.

An example of an operation sequence of the light emitting element drive apparatus according to the present embodiment will be explained using the transition table shown in FIG. 14. In the initial state (step=1), LED array loads 14, 17 and 18 (in which the magnitudes of forward voltage drops are 14 V, 17 V and 18 V, respectively) connect to voltage converting circuit 1. Further, in the initial state, LED array loads 11, 15 and 16 (in which the magnitudes of forward voltage drops are 11 V, 15 V and 16 V, respectively) connect to voltage converting circuit 2. Furthermore, in the initial state, LED array loads 12, 13 and 19 (in which the magnitudes of forward voltage drops are 12 V, 13 V and 19 V, respectively) connect to voltage converting circuit 3. Still further, voltage converting circuits 1 to 3 are controlled by PWM controlling sections 33 to 37, respectively, to make the minimum cathode terminal voltage among cathode terminal voltages of the connected LED array loads 1 V.

First, in the state of step=1, the sum of the cathode terminal voltages of the LED array loads is 33 V. That is, if the load current flowing in each LED array load is 100 mA, 33×0.1=3.3 W is loss power that does not contribute to light emission.

Here, the LED array load having the maximum cathode terminal voltage among the LED array loads connected to voltage converting circuit 1 is LED array load 14, and therefore address signal MaxAdr1 indicates the address of LED array load 14.

The LED array load having the maximum cathode terminal voltage among the LED array loads connected to voltage converting circuit 2 is LED array load 11, and therefore address signal MaxAdr2 indicates the address of LED array load 11. The LED array load having the minimum cathode terminal voltage among the LED array loads connected to voltage converting circuit 2 is LED array load 16, and therefore address signal MinAdr2 indicates the address of LED array load 16.

The LED array load having the maximum cathode terminal voltage among the LED array loads connected to voltage converting circuit 3 is LED array load 19, and therefore address signal MinAdr3 indicates the address of LED array load 19.

Switching controlling section 41c switches between the LED array load specified by address signal MaxAdr1 and the LED array load specified by address signal MinAdr2. Further, switching controlling section 41c switches between the LED array load specified by address signal MaxAdr2 and the LED array load specified by address signal MinAdr3. That is, in step=1, LED array loads 14 and 16 switch, and LED array loads 11 and 19 switch. Consequently, voltage converting circuits 1 to 3 transition to the state indicated in step=2.

In step=2, switching controlling section 41c switches between the LED array load specified by address signal MaxAdr1 and the LED array load specified by address signal MinAdr2. Further, switching controlling section 41c switches between the LED array load specified by address signal MaxAdr2 and the LED array load specified by address signal MinAdr3. That is, LED array loads 16 and 19 switch, and LED array loads 13 and 14 switch. Consequently, voltage converting circuits 1 to 3 transition to the state indicated in step=3.

Similarly, in step=3, switching controlling section 41c switches between LED array load 16 specified by address signal MaxAdr2 and LED array load 17 specified by address signal MinAdr1. Further, switching controlling section 41c switches between LED array load 13 specified by address signal MaxAdr2 and LED array load 14 specified by address signal MinAdr3. Here, when LED array loads are reconnected between voltage converting circuits 2 and 3, the same LED array loads are repeatedly reconnected twice. After the same LED array loads are repeatedly reconnected twice between predetermined voltage converting circuits, switching controlling section 41c finishes a reconnection control between these voltage converting circuits. That is, the reconnection control of LED array loads between voltage converting circuits 2 and 3 is finished in step=3.

Next, in step=4, LED array load 16 specified by address signal MaxAdr1 and LED array load 17 specified by address signal MinAdr2 are reconnected. Here, when LED array loads are reconnected between voltage converting circuits 1 and 2, the same LED array loads are repeatedly reconnected twice. That is, the reconnection control of LED array loads between voltage converting circuits 1 and 2 is finished in step=4. Thus, the controlling section finishes controlling the switching section when each voltage applying section repeatedly switches connection of the same light emitting element array, it is possible to easily finish reconnecting LED array loads in an optimal state by the minimal number of reconnections.

After all of LED array loads are reconnected, the state of step=5 is provided. In step=5, the sum of cathode terminal voltages of each LED array load is 18 V. Upon comparison of cathode terminal voltages of LED array loads in step=1 and step=5, the cathode terminal voltages in step=5 are 15 V lower than in step=1. That is, assuming that load currents of LED array loads are 100 mA, 1.5 W of power loss is reduced.

By performing the above operation, it is possible to classify LED array loads 11 to 19 based on the magnitudes of forward voltage drops, and assign LED array loads 11 to 19 to voltage converting circuit 1, voltage converting circuit 2 and voltage converting circuit 3.

Consequently, it is possible to reduce variability between forward voltage drops of LED array loads connected to pre-determined voltage converting circuits, and reduce power consumption of light emitting element drive apparatus.

Embodiment 6

Figure 15:
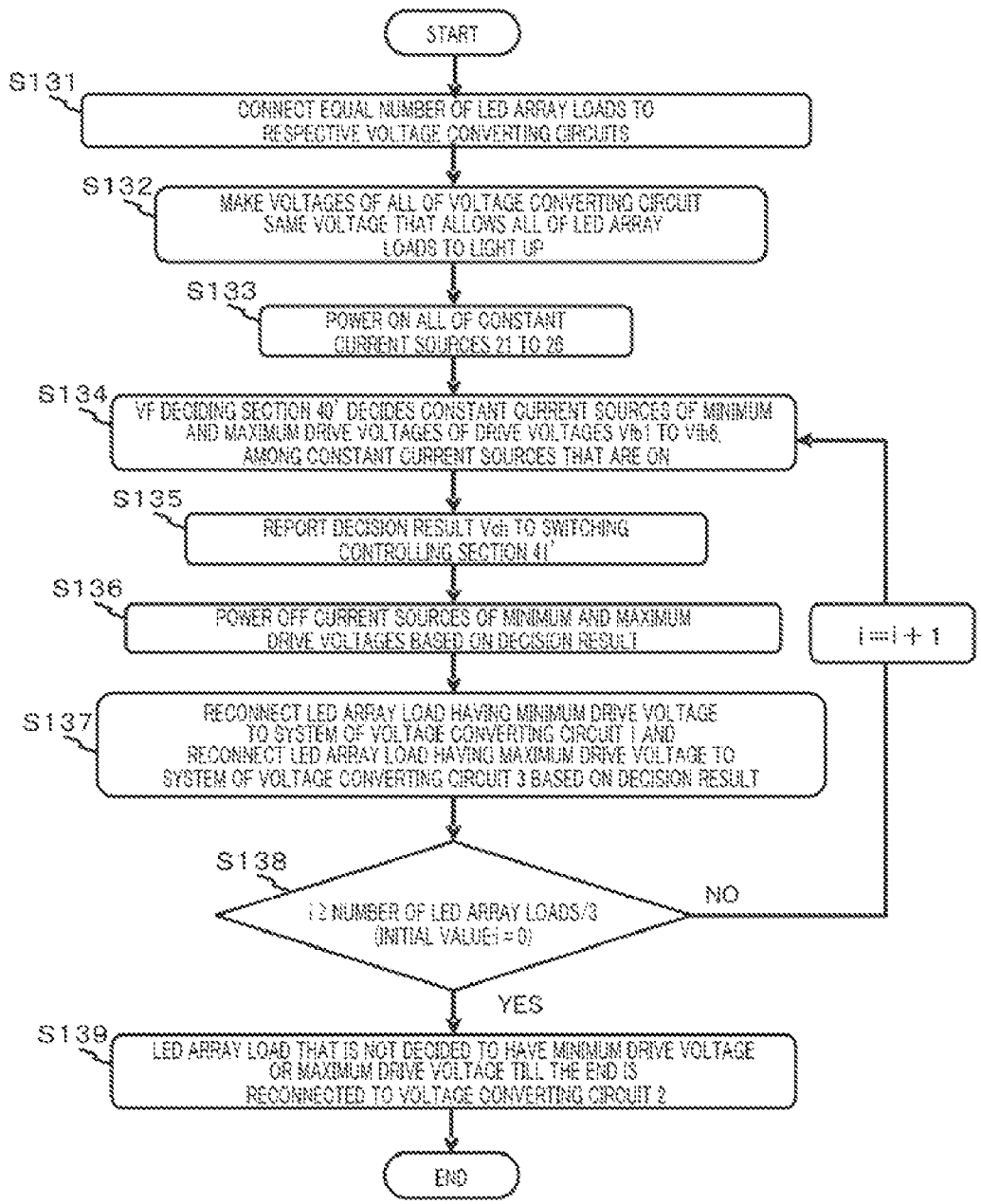
FIG. 15 is a flowchart showing a switching operation sequence according to Embodiment 6 of the present invention.

The operation sequence of a light emitting element drive apparatus according to Embodiment 6 of the present invention will be explained using FIG. 15. The light emitting element drive apparatus according to the present embodiment differs from the light emitting element drive apparatus according to Embodiment 3 shown in FIG. 10 in the usage of voltage converting circuits that are used to decide drive voltages of LED array loads. To be more specific, VF deciding section 40b and switching controlling section 41b change to VF deciding section 40' and switching controlling section 41', and the their operations are different. With the present embodiment, in the light emitting element drive apparatus, the controlling section controls the switching section to connect all of light emitting element arrays equally to all of voltage applying sections and then controls the switching section to connect the light emitting element array producing the maximum forward voltage drop among all of the light emitting element arrays that are being driven, to the first voltage applying section, and turns off driving this light emitting element array producing the maximum forward voltage drop, and controls the switching section to connect the light emitting element array producing the minimum forward voltage drop among all of the light emitting element arrays that are driven, to the second voltage applying section, in order to stop driving this light emitting element array producing the minimum forward voltage drop. The details will be explained below using a specific example.

The following specific example illustrates the operation, and assumes that the relationship between forward voltage drops of LED load arrays 11 to 14 is. "Vf1<Vf2<Vf3<Vf4<Vf5<Vf6."

First, switching circuits 30 and 31 are controlled to connect LED array loads equally to respective voltage converting circuits and connect the cathode terminal of each LED array load to the corresponding minimum value detecting section (step S131). Next, voltages of all of voltage converting circuits are made the same voltages that allow all of LED array loads to light up. Then, constant current sources 21 to 26 are all powered on to drive all of LED array loads (step S133).

Next, VF deciding section 40' detects minimum cathode terminal voltage Vfb6 and maximum cathode terminal voltage Vfb1 among cathode terminal voltages Vfb1 to Vfb6 at constant current sources 21 to 26 that are on. By this means, VF deciding section 40' decides which constant current source is driven by the minimum cathode terminal voltage and which constant current source is driven by the maximum cathode terminal voltage (step S134). Then, VF deciding section 40' reports the decision result (i.e. decision signal Vch) to switching controlling section 41' (step S135).

Switching controlling section 41' inputs control signal Vsel3 generated based on the decision result, to current controlling section 42. Current controlling section 42 powers off constant current source 26 to which the minimum cathode terminal voltage applies, and constant current source 21 to which the maximum cathode terminal voltage applies (step S136).

Further, switching controlling section 41' controls switching circuits 30 and 31 according to control signals Vsel1 and Vsel2, and switches the connections related to LED array loads 11 and 16 having maximum and minimum terminal voltages Vfb1 and Vfb6. To be more specific, switching controlling section 41' switches the connection destination of anode terminal P6H of LED array load 16 to output terminal PO1 of voltage converting circuit 1, and switches the connection destination of cathode terminal P6L to minimum value detecting section 32 (if originally connected, this connection is maintained). That is, LED array load 16 producing the maximum forward voltage drop connects to the first voltage applying section formed with voltage converting circuit 1 and minimum value detecting section 32. Further, accompanying this, switching controlling section 41' switches the connection destination of anode terminal P1H of LED array load 11 to output terminal PO3 of voltage converting circuit 3, and switches the connection destination of cathode terminal P1L to minimum value detecting section 36 (if originally connected, this connection is maintained). That is, LED array load 11 producing the minimum forward voltage drop connects to the second voltage applying section formed with voltage converting circuit 3 and minimum value detecting section 36 (step S137).

Similarly, step S134 to step S137 repeat a number of times corresponding to one third of the number of LED array loads, that is, a number of times equivalent to the value dividing the number of LED array loads by the number of voltage applying sections (step S138). With the present embodiment, step S134 to step S137 repeat twice. LED array loads that are not selected in the above decision connect to voltage converting circuit 2, so that the reconnection is finished.

Further, an example of the above operation sequence assumes that the number of reconnections is made one third (i.e. three times with the present embodiment) of the number of LED array loads to make the number of LED array loads connected to voltage converting circuits 1 to 3 substantially the same. However, the number of reconnections for realizing the functions of the present invention is not limited to this. Note that, by making the number of reconnections three, it is possible to make the number of LED array loads connected to each voltage applying section equal and make the loads of the voltage applying sections equal. Generally, if the total number of voltage applying sections is M and the total number of light emitting arrays to connect is N, N/M light emitting element arrays only need to connect to one voltage applying section. Consequently, by repeating reconnection processing N/M times with respect to one voltage applying section, it is possible to make the number of light emitting element arrays to connect to one voltage applying section optimal to make the loads equal. Further, although not required with the present embodiment, in case where the number of voltage applying sections increases, the above-described processing repeats N/M times, then the voltage applying section of the connection switching destination changes and the above-described processing repeats again. By this means, it is possible to connect an equal number of light emitting element arrays to each voltage applying section. Here, M and N are positive integers and M<N.

According to the present embodiment, by making the voltages of all of voltage converting circuits the same voltage that allows all of LED array loads to light up, the minimum drive voltage and the maximum drive voltage are decided. That is, with Embodiment 3, all of LED array loads connect to one voltage converting circuit first and the burden on this voltage converting circuit increases, and therefore this voltage converting circuit requires a greater capacity than other voltage converting circuits. By contrast with this, with the present embodiment, when or after drive voltages are decided, the number of LED array loads connected to voltage converting circuits becomes substantially equal. Consequently, the scale of voltage converting circuits and the specification of components become equal, thereby providing an advantage of minimizing the amount of architecture work and the types of components.

Embodiment 7

Figure 16:
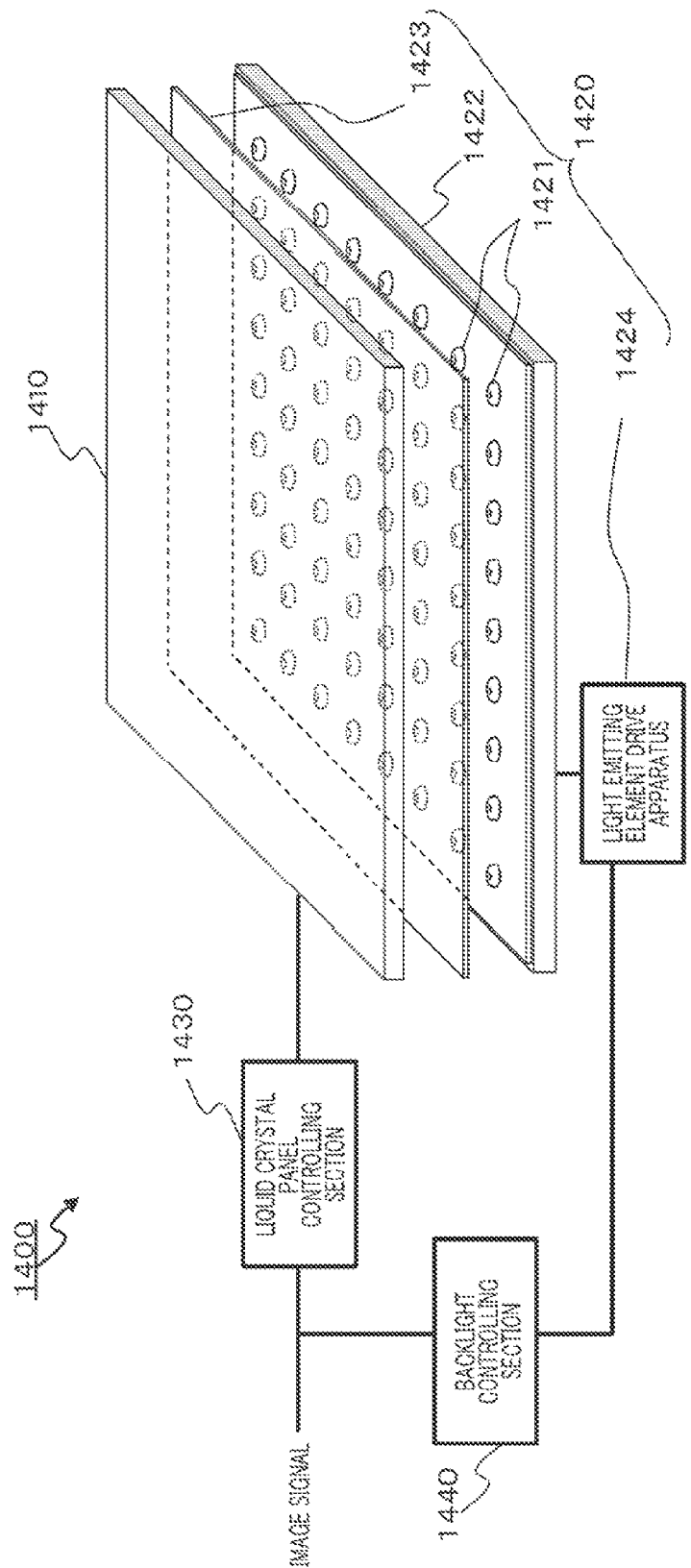
FIG. 16 is a schematic configuration diagram of a liquid crystal display apparatus with a planar illumination apparatus according to embodiments of the present invention.

Next, a liquid crystal display apparatus with a planar illumination apparatus according to embodiments of the present invention will be explained. FIG. 16 is a schematic configuration diagram showing the liquid crystal display apparatus with the planar illumination apparatus according to embodiments of the present invention.

Liquid crystal display apparatus 1400 has liquid crystal panel 1410 and planar illumination apparatus 1420.

Further, liquid crystal display apparatus 1400 has liquid crystal panel controlling section 1430 and backlight controlling section 1440. Liquid crystal panel controlling section 1430 controls the optical transmittance of each pixel (not shown) provided in liquid crystal display panel 1410 based on image signals received as input. Backlight controlling section 1440 controls, per predetermined light emitting area, the intensity of illumination light emitted from planar illumination apparatus 1420, based on image signals received as input.

Planar illumination apparatus 1420 has: a plurality of light emitting elements 1421; base 1422 formed with a reflecting plate and a substrate on which light emitting elements 1421 are mounted; and optical sheet 1423 that makes light emitted from light emitting elements 1421, uniform planar light. To be more specific, light emitting elements 1421 are LEDs that emit white light. Optical sheet 1423 may be formed with a plurality of optical sheets such as diffusing plates and brightness enhancement films. Further, planar illumination apparatus 1420 has light emitting element drive apparatus 1424 that drives light emitting elements 1421 based on signals outputted from backlight controlling section 1440. Light emitting element drive apparatus 1424 is the light emitting element drive apparatus disclosed in above-described Embodiments 1 to 6.

Liquid crystal panel 1410 receives illumination light on its back surface, as input from planar illumination apparatus 1420, and displays images by spatially modulating illumination light according to image signals.

Planar illumination apparatus 1420 according to the present embodiment has light emitting element drive apparatus 1424 and, consequently, can be configured to suppress the increase in power consumption caused by variability between forward voltage drops of LEDs. Further, liquid crystal display apparatus 1400 according to the present embodiment has light emitting element drive apparatus 1424 and, consequently, can be configured to suppress the increase in power consumption caused by variability between forward voltage drops of LEDs.

INDUSTRIAL APPLICABILITY

The present invention contributes to saving power in a liquid crystal display apparatus such as a liquid crystal television and a liquid crystal monitor, a planar illumination apparatus that is used as the backlight of the liquid crystal display apparatus and a light emitting element drive apparatus that is used for the backlight.

REFERENCE SIGNS LIST 1, 2, 3 VOLTAGE CONVERTING CIRCUIT
11, 12, 13, 14, 15, 16, 17, 18, 19 LED ARRAY LOAD
21, 22, 23, 24, 25, 26, 27, 28, 29 CONSTANT CURRENT SOURCE
30, 31 SWITCHING CIRCUIT
30a, 30b, 30c, 30d, 30e, 30f, 30g, 30h, 30i SELECTOR
31a, 31b, 31c, 31d, 31e, 31f SELECTOR
32, 34, 36 MINIMUM VALUE DETECTING SECTION
33, 35, 37 PWM CONTROLLING SECTION
40, 40b, 40' VF DECIDING SECTION
41, 41b, 41c, 41' SWITCHING CONTROLLING SECTION
42 CURRENT CONTROLLING SECTION
44 VOLTAGE COMPARING SECTION
44a, 44b, 44c, 44d COMPARATOR
50 CONSTANT CURRENT SOURCE
51, 52, 53, 54 pnp TRANSISTOR
55, 56, 57, 58 RESISTANCE
59, 60, 61, 62 BUFFER CIRCUIT
71, 72, 73 ADDRESS DETECTING SECTION
90 SWITCHING CIRCUIT
90a, 90b, 90c, 90d, 90e, 90f, 90g, 90h, 90i SELECTOR
100 VOLTAGE CONVERTING CIRCUIT
101 COIL
102 DIODE
103 TRANSISTOR
104 CAPACITOR
110, 111, 112, 113 LED ARRAY LOAD
120, 121, 122, 123 CONSTANT CURRENT SOURCE
130 SELECTING CIRCUIT
131 CONTROLLING CIRCUIT
1400 LIQUID CRYSTAL DISPLAY APPARATUS
1410 LIQUID CRYSTAL PANEL
1420 PLANAR ILLUMINATION APPARATUS
1421 LIGHT EMITTING ELEMENT
1422 BASE
1423 OPTICAL SHEET
1424 LIGHT EMITTING ELEMENT DRIVE APPARATUS
1430 LIQUID CRYSTAL PANEL CONTROLLING SECTION
1440 BACKLIGHT CONTROLLING SECTION

The invention claimed is:

1. A light emitting element drive apparatus to drive a plurality of light emitting arrays, comprising:
a plurality of voltage applying sections that are provided to generate a plurality of application voltages for-driving, the number of the voltage applying sections being smaller than the number of the light emitting arrays;
a switching section that switches voltage applying sections to which the plurality of light emitting element arrays are individually connected, between the plurality of voltage applying sections; and
a controlling section that controls the switching section, wherein:
each of the plurality of voltage applying sections generates an application voltage to apply to said light emitting element arrays connected to that voltage applying section, based on a detection voltage determined based on a maximum forward voltage drop among forward voltage drops of the light emitting element arrays connected to that voltage applying section; and
the controlling section divides the plurality of light emitting element arrays into a plurality of groups, the plurality of groups corresponding to the plurality of voltage applying sections respectively, such that, a total value of differences between said forward voltage drops and said application voltage is minimum in each of the plurality of light emitting arrays, and the plurality of light emitting element arrays are connected to different voltage applying sections per group.

2. The light emitting element drive apparatus according to claim 1, wherein the detection voltage is a minimum voltage among current source voltages at a plurality of current sources connected to respective cathode terminals of the plurality of light emitting element arrays.

3. The light emitting element drive apparatus according to claim 1, wherein the controlling section controls the switching section to connect all of the plurality of voltage applying sections to a same voltage applying section among the plurality of voltage applying sections, and then controls the switching section to connect a light emitting element array producing a maximum forward voltage drop among the light emitting element arrays connected to the same voltage applying section, to another voltage applying section.

4. The light emitting element drive apparatus according to claim 1, wherein the controlling section controls the switching section to connect all of the plurality of light emitting element arrays to a same voltage applying section among the plurality of voltage applying sections, and then controls the switching section to connect a light emitting element array producing a minimum forward voltage drop among the light emitting element arrays connected to the same voltage applying section, to another one voltage applying section.

5. The light emitting element drive apparatus according to claim 1, wherein:
the number of the voltage applying sections is M and the number of the light emitting element arrays is N, where M and N are positive integers, M is smaller than N, and N is an integral multiple of M; and
the controlling section repeats, N/M times, processing of controlling the switching section to connect all of N light emitting element arrays to a single voltage applying section among M voltage applying sections, and then controls the switching section to connect a light emitting element array producing a maximum forward voltage drop among the light emitting element arrays connected to the single voltage applying section, to another one voltage applying section.

6. The light emitting element drive apparatus according to claim 5, wherein, when M, the number of the voltage applying sections, is greater than 2, the controlling section repeats the processing N/M times, then changes a voltage applying section as a connection switching destination, and repeats the processing again.

7. The light emitting element drive apparatus according to claim 6, wherein the controlling section repeats changing the voltage applying section as the connection switching destination (M−2) times.

8. The light emitting element drive apparatus according to claim 1, wherein:
the number of the voltage applying sections is M and the number of the light emitting element arrays is N, where M and N are positive integers, M is smaller than N, and N is an integral multiple of M; and
the controlling section repeats, N/M times, processing of controlling the switching section to connect all of N light emitting element arrays to a same voltage applying section among M voltage applying sections, and then controls the switching section to connect a light emitting element array producing a minimum forward voltage drop among the light emitting element arrays connected to the same voltage applying section, to another one voltage applying section.

9. The light emitting element drive apparatus according to claim 8, wherein, when M, the number of the voltage applying sections, is greater than 2, the controlling section repeats the processing N/M times, then changes a voltage applying section as a connection switching destination, and repeats the processing again.

10. The light emitting element drive apparatus according to claim 9, wherein the controlling section repeats changing the voltage applying section as the connection switching destination (M−2) times.

11. The light emitting element drive apparatus according to claim 1, wherein the controlling section controls the switching section to connect all of the plurality of light emitting element arrays to a same voltage applying section among the plurality of voltage applying sections, and then controls the switching section to connect a light emitting element array producing a maximum forward voltage drop among the light emitting element arrays connected to the same voltage applying section, to another voltage applying section, and connect a light emitting element array producing a minimum forward voltage drop among the light emitting element arrays connected to the same voltage applying section, to yet another voltage applying section.

12. The light emitting element drive apparatus according to claim 1, wherein:
the number of the voltage applying sections is M and the number of the light emitting element arrays to connect is N, where M and N are positive integers, M is equal to or greater than 3, N is greater than M, and N is an integral multiple of M; and
the controlling section repeats, N/M times, processing of controlling the switching section to connect all of N light emitting element arrays to a same voltage applying section among M voltage applying sections, and then controls the switching section to connect a light emitting element array producing a maximum forward voltage drop among the light emitting element arrays connected to the same voltage applying section, to another one voltage applying section, and connect a light emitting element arrays producing a minimum forward voltage drop among the light emitting element arrays connected to the same voltage applying section, to yet another one voltage applying section.

13. The light emitting element drive apparatus according to claim 12, wherein, when M, the number of the voltage applying sections, is equal to or greater than 3,the controlling section repeats the processing N/M times, then changes a voltage applying section as a connection switching destination, and repeats the processing again.

14. The light emitting element drive apparatus according to claim 1, wherein the controlling section controls the switching section to connect all of the plurality of light emitting element arrays to a same voltage applying section among the plurality of voltage applying sections, and then controls the switching section to compare a predetermined threshold voltage and current source voltages at a plurality of current sources connected to cathode terminals of the plurality of light emitting element arrays,and connect a light emitting element array having a current source voltage exceeding the threshold voltage, to another voltage applying section.

15. The light emitting element drive apparatus according to claim 1, wherein the controlling section controls the switching section to connect all of the plurality of light emitting element arrays to a same voltage applying section among the plurality of voltage applying sections, and then controls the switching section to compare a predetermined threshold voltage and current source voltages at a plurality of current sources connected to cathode terminals of the plurality of light emitting element arrays, and connect a light emitting element array having a current source voltage less than the threshold voltage, to another voltage applying section.

16. The light emitting element drive apparatus according to claim 1, wherein the controlling section controls the switching section to connect all of the plurality of light emitting element arrays equally to all of the plurality of voltage applying sections, and then controls the switching section to connect a light emitting element array producing a maximum forward voltage drop among all of light emitting elements that are being driven, to a first voltage applying section, and turns off driving the light emitting element array producing the maximum forward voltage drop and controls the switching section to connect a light emitting element array producing a minimum forward voltage drop among all of light emitting elements that are being driven, to a second voltage applying section, and turns off driving the light emitting element array producing the minimum forward voltage drop.

17. The light emitting element drive apparatus according to claim 1, wherein:
the number of the voltage applying sections is M and the number of the light emitting element arrays is N, where M and N are positive integers, M is equal to or greater than 3, N is greater than M, and N is an integral multiple of M; and
the controlling section repeats, N/M times, processing of controlling the switching section to connect all of N light emitting element arrays equally to M voltage applying sections, and then controls the switching section to connect a light emitting element array producing a maximum forward voltage drop among all of light emitting elements that are being driven, to one voltage applying section among the M voltage applying sections, and turns off driving the light emitting element array producing the maximum forward voltage drop, and controls the switching section to connect a light emitting element array producing a minimum forward voltage drop among all of light emitting elements that are being driven, to another one voltage applying section among the M voltage applying sections, and turns off driving the light emitting element array producing the minimum forward voltage drop.

18. The light emitting element drive apparatus according to claim 17, wherein, when M, the number of the voltage applying sections, is equal to or greater than 3, the controlling section repeats the processing N/M times, then changes a voltage applying section as a connection switching destination and repeats the processing again.

19. The light emitting element drive apparatus according to claim 1, wherein:
the number of the voltage applying sections is 3, and the voltage applying sections are first, second and third voltage applying sections;
the controlling section performs first reconnection control to switch light emitting arrays to connect to the first and second voltage applying sections, and performs second reconnection control to switch light emitting arrays to connect to the second and third voltage applying sections;
in the first reconnection control, a light emitting array producing a maximum forward voltage drop among the light emitting arrays connected to the second voltage applying section, to the first voltage applying section, and, at the same time, a light emitting array producing a minimum forward voltage drop among the light emitting arrays connected to the first voltage applying section, to the second voltage applying section; and in the second reconnection control, a light emitting array producing a minimum forward voltage drop among the light emitting arrays connected to the second voltage applying section, to the third voltage applying section, and, at the same time, a light emitting array producing a maximum forward voltage drop among the light emitting arrays connected to the third voltage applying section, to the second voltage applying section.

20. The light emitting element drive apparatus according to claim 19, wherein, the controlling section finishes the first reconnection control when the same pair of a light emitting array connected to the first voltage applying section and a light emitting array connected to the second voltage applying section repeat being switched, and finishes the second reconnection control when the same pair of a light emitting array connected to the second voltage applying section and a light emitting array connected to the third voltage applying section repeat being switched.

21. The light emitting element drive apparatus according to claim 1, wherein the plurality of voltage applying sections each comprise:

a detecting circuit that connects to cathode terminals of the plurality of light emitting element arrays and that detects the detection voltage; and a voltage converting circuit that connects to anode terminals of the plurality of light emitting element arrays and that applies an application voltage to the plurality of light emitting element arrays based on the detection voltage.

22. A planar illumination apparatus comprising:

a plurality of light emitting element arrays arranged on a planar surface; and the light emitting element drive apparatus according to claim 1 that connects to the plurality of light emitting element arrays.

23. A liquid crystal display apparatus comprising:

the planar illumination apparatus according to claim 22; and a liquid crystal panel that receives illumination light on a back surface thereof, as input from the planar illumination apparatus and displays an image by spatially modulating the illumination light according to an image signal.

24. The light emitting element drive apparatus according to claim 1, wherein the controlling section performs the grouping such that a group to include a specific light emitting element array and a light emitting element array having a small forward voltage drop difference with respect to the specific light emitting element array, and a group to include a light emitting element array having a large forward voltage drop difference with respect to the specific light emitting element array, are formed.

* * * * *